US012711605B2

(12) United States Patent
Schwarzband et al.

(10) Patent No.: US 12,711,605 B2
(45) Date of Patent: Aug. 18, 2026

(54) SYSTEMS AND METHODS FOR REGISTRATION BETWEEN IMAGES INFORMATIVE OF ONE OR MORE SEMICONDUCTOR SPECIMENS

(71) Applicant: Applied Materials Israel Ltd., Rehovot (IL)

(72) Inventors: Ishai Schwarzband, Or-Yehuda (IL); Yan Avniel, Rehovot (IL); Roman Kris, Rehovot (IL); Shani Gat, Tel-Aviv (IL); Orel Bat Mor, Tkuma (IL); Tal Frank, Tel-Aviv (IL); Rafael Bistritzer, Petach Tikva (IL); Sahar Levin, Ganey Tikva (IL)

(73) Assignee: Applied Materials Israel Ltd., Rehovot (IL)

( * ) Notice: Subject to any disclaimer, the term of this patent is extended or adjusted under 35 U.S.C. 154(b) by 269 days.

(21) Appl. No.: 18/404,835

(22) Filed: Jan. 4, 2024

(65) Prior Publication Data

US 2025/0225646 A1 Jul. 10, 2025

(51) Int. Cl.

*G06T 7/00* (2017.01)
*G06T 7/13* (2017.01)
*G06T 7/168* (2017.01)
*G06T 7/60* (2017.01)

(52) U.S. Cl.

CPC ............ *G06T 7/001* (2013.01); *G06T 7/0006* (2013.01); *G06T 7/13* (2017.01); *G06T 7/168* (2017.01); *G06T 7/60* (2013.01); *G06T 2207/20048* (2013.01); *G06T 2207/30148* (2013.01)

(58) Field of Classification Search

None

See application file for complete search history.

(56) References Cited

U.S. PATENT DOCUMENTS

2006/0262977 A1* 11/2006 Mitsui .................. G03F 7/7065 382/199
2007/0053582 A1* 3/2007 Yamashita ................ G06T 7/32 382/151
2025/0078249 A1* 3/2025 Jeon .................. G01N 21/9501

OTHER PUBLICATIONS

Web: "Chebyshev Distance," Wikipedia, Dec. 2, 2023, 03 pages, Retrieved from [https://en.wikipedia.org/wiki/Chebyshev_distance].

(Continued)

*Primary Examiner* — Joseph R Haley
(74) *Attorney, Agent, or Firm* — Lowenstein Sandler LLP

(57) ABSTRACT

There are provided systems and methods comprising obtaining an inspection image of a semiconductor specimen and a second image, applying a distance transform operation to at least part of the second image, or to at least part of an image derived from the second image, thereby obtaining at least one transform image, applying a distance transform operation to at least part of the inspection image, or to at least part of an image derived from the inspection image, thereby obtaining a transformed inspection image, performing a matching operation using data informative of the at least one transform image and data informative of the transformed inspection image, thereby obtaining matching data, and using the matching data to identify an area of the inspection image which matches the second image according to a matching criterion.

14 Claims, 20 Drawing Sheets

(56) References Cited

OTHER PUBLICATIONS

Web: "Euclidean Distance," Wikipedia, Nov. 23, 2023, 08 pages, Retrieved from [https://en.wikipedia.org/wiki/Euclidean_distance].
Web: "Taxicab Geometry," Wikipedia, Dec. 2, 2023, 06 pages, Retrieved from [https://en.wikipedia.org/wiki/Taxicab_geometry].

* cited by examiner

Identifying an area of the inspection image matching the design image — 800

Estimating a difference in size between the design structural element(s) of the design image and the actual structural element(s) in the area of the inspection image — 810

SYSTEMS AND METHODS FOR REGISTRATION BETWEEN IMAGES INFORMATIVE OF ONE OR MORE SEMICONDUCTOR SPECIMENS

TECHNICAL FIELD

The presently disclosed subject matter relates, in general, to the field of examination of a specimen, and more specifically, to automating the examination of a specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various steps during semiconductor fabrication to measure dimensions of the specimens (metrology), and/or to detect and classify defects on specimens (e.g., Automatic Defect Classification (ADC), Automatic Defect Review (ADR), etc.).

GENERAL DESCRIPTION

In accordance with certain aspects of the presently disclosed subject matter, there is provided a system comprising a processing circuitry configured to: obtain an inspection image of a semiconductor specimen, and a second image, apply a distance transform operation to at least part of the design image, or to at least part of an image derived from the design image, thereby obtaining at least one transform image, apply a distance transform operation to at least part of the inspection image, or to at least part of an image derived from the inspection image, thereby obtaining a transformed inspection image, perform a matching operation using data informative of the at least one transform image and data informative of the transformed inspection image, thereby obtaining matching data, and use the matching data to identify an area of the inspection image which matches the second image according to a matching criterion.

According to some examples, the second image is a second inspection image of a semiconductor specimen, wherein the inspection image and the second inspection image are informative of the same semiconductor specimen, or of different semiconductor specimens.

According to some examples, the inspection image is informative of a plurality of first structural elements and the second inspection image is informative of a plurality of second structural elements, wherein the system is configured to determine edges of at least part of the first structural elements, and use at least part of said edges to apply said distance transform operation to at least part of the inspection image, or to at least part of an image derived from the inspection image, to obtain said transformed inspection image, or data informative thereof, determine edges of at least part of the second structural elements, and use at least part of said edges to apply said distance transform operation to at least part of the second inspection image, or to at least part of an image derived from the second inspection image, thereby obtaining said at least one transform image, or data informative thereof.

According to some examples, the second image is a design image.

According to some examples, for at least one structural element present in the inspection image, the system is configured to use the matching data to determine whether one or more dimensions of the structural element have been increased or reduced with respect to one or more dimensions of a corresponding structural element in the second image.

According to some examples, responsive to determination that one or more dimensions of the structural element have been increased with respect to one or more dimensions of the corresponding structural element in the second image, the system is configured to increase one or more dimensions of the corresponding structural element in the second image, thereby obtaining a corrected second image, and to use the corrected second image to identify an area of the inspection image which matches the corrected second image according to the matching criterion.

According to some examples, responsive to determination that one or more dimensions of the structural element have been reduced with respect to one or more dimensions of the corresponding structural element in the second image, the system is configured to reduce one or more dimensions of the corresponding structural element in the second image, thereby obtaining a corrected second image, and to use the corrected second image to identify an area of the inspection image which matches the corrected second image according to the matching criterion.

According to some examples, for at least one structural element present in the inspection image, the system is configured to use data informative of the transformed inspection image to estimate a difference in size between the structural element and a corresponding design structural element in the second image.

According to some examples, the system is configured to apply a distance transform operation to a subset of pixels of the design image, or of an image derived from the design image, which have a pixel intensity equal to a first value, or within a first range, thereby obtaining the transform image.

According to some examples, the system is configured to apply a distance transform operation to pixels of an image obtained using a complement of the design image or of an image derived from the design image, thereby obtaining the transform image.

According to some examples, the system is configured to apply a distance transform operation to a first group of pixels of the design image, or to an image derived from the design image, thereby obtaining at least one first transform image, apply a distance transform operation to a second group of pixels of an image derived from a complement of the design image, thereby obtaining at least one second transform image, perform a matching operation using data informative of the at least one first transform image and data informative of the transformed inspection image, thereby obtaining first matching data, perform a matching operation using data informative of the at least one second transform image and data informative of the transformed inspection image, thereby obtaining second matching data, and use the first and second matching data to identify an area of the inspection image which matches the design image according to a matching criterion.

According to some embodiments, the design image is informative of one or more design structural elements, wherein the system is configured to apply a distance transform operation to pixels of the design image, or of an image derived from the design image, which are located within an inner portion of each design structural element, thereby obtaining the transform image, apply a distance transform operation to pixels of the design image, or of an image derived from the design image, which are located outside of the design structural elements, thereby obtaining a second transform image, and use the transform image and the second transform image to identify an area of the inspection image which matches the second image according to a matching criterion.

According to some embodiments, data informative of the at least one transform image includes data informative of a difference between the transform image and an average value of pixels of the transform image.

According to some embodiments, data informative of the transformed inspection image includes data informative of a difference between part of the transformed inspection image and an average value of pixels of said part of the transformed inspection image.

According to some embodiments, the system is configured apply a distance transform operation to pixels which have a pixel intensity equal to a first value, or within a first range, in the design image, or in an image derived from the design image, to obtain the transform image, add artificial edges at boundaries of the design image, or to the image derived from the design image, to obtain a first design image, apply a distance transform operation to pixels which have a pixel intensity equal to the first value, or within the first range, in the first design image, to obtain a third transform image, perform a comparison between pixels of the first transform image and pixels of the third transform image, generate a first mask based on the comparison, and use the first mask to generate data informative of the at least one transform image.

According to some embodiments, the system is configured to apply a distance transform operation to given pixels of a second design image obtained based on a complement of the design image, wherein the second design image includes artificial edges, to obtain a fourth transform image, perform a comparison between pixels of the second transform image and pixels of the fourth transform image, generate a second mask based on this comparison, and use the second mask to generate data informative of the at least one transform image.

According to some embodiments, the design image is informative of design elements and of areas separating the design elements, wherein the system is operative to determine a match between the design image and an area of the inspection image in a configuration in which it is unknown which pixels belong to an inner part of the design elements of the design image and which pixels belong to the areas of the design image.

According to some embodiments, the inspection image is informative of a plurality of first structural elements, wherein the system is configured to determine edges of at least part of the first structural elements, and use at least part of said edges to apply said distance transform operation to at least part of the inspection image, or to at least part of an image derived from the inspection image.

In accordance with other aspects of the presently disclosed subject matter, there is provided a computer-implemented method comprising obtaining an inspection image of a semiconductor specimen, and a second image, applying a distance transform operation to at least part of the de second image, or to at least part of an image derived from the second image, thereby obtaining at least one transform image, applying a distance transform operation to at least part of the inspection image, or to at least part of an image derived from the inspection image, thereby obtaining a transformed inspection image, performing a matching operation using data informative of the at least one transform image and data informative of the transformed inspection image, thereby obtaining matching data, and using the matching data to identify an area of the inspection image which matches the second image according to a matching criterion.

According to some examples, the method can implement one or more of the features described above with reference to the system (these features are therefore not repeated).

In accordance with other aspects of the presently disclosed subject matter, there is provided a non-transitory computer readable medium comprising instructions that, when executed by one or more processing circuitries, cause the one or more processing circuitries to perform operations described with reference to the method above.

The proposed solution provides various technical advantages. At least some of them are listed hereinafter.

According to some examples, the proposed solution enables efficient and accurate registration between an inspection image of a semiconductor specimen and a design image.

According to some examples, the proposed solution enables efficient and accurate registration between an inspection image of a semiconductor specimen and a design image.

According to some examples, the proposed solution enables efficient and accurate registration between an inspection image of a semiconductor specimen and a design image, even in the presence of effects such as SEM signal intensity variations, wafer charging, or other types of systematic and arbitrary noise.

According to some examples, the proposed solution enables determining whether structural elements in a specimen have been widened or narrowed with respect to corresponding structural elements in a design image.

According to some examples, the proposed solution enables estimating a difference in size between structural elements of a specimen and corresponding structural elements in a design image.

According to some examples, the proposed solution enables efficient and accurate registration between two inspection images of a semiconductor specimen or of different semiconductor specimens.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Registration between images is required in various applications. In some cases, it can be required to register a design image with an inspection image of a semiconductor specimen. Difference between features in the inspection image and in the design image can be due to various factors such as (but not limited to), Focus and Exposure variation (FEM), mask degradation, simulation limitations, changing of process parameters, mask optical proximity corrections features, etc. Standards registration methods suffer from various drawbacks. In some other examples, it can be required to register two different inspection images, such as two SEM images. New systems and methods are provided hereinafter in the field of image registration.

According to some examples, an inspection image of a specimen, together with a design image are obtained. In order to register the design image with the inspection image, a distance transform operation is applied to the design image (and, in some examples, to the complement of the design image). At least one transform image is obtained. Similarly, a distance transform operation is applied to the inspection image. A transformed inspection image is obtained. A comparison between data informative of the transform image and data informative of the transformed inspection image enables identifying an area of the inspection image which matches the design image. Registration is therefore obtained. If necessary, a geometrical transformation of one or more design elements of the design image can be performed, such that they match corresponding structural elements present in this area of the inspection image.

Note that a similar method can be used to register a first inspection image with a second inspection image. According to some embodiments, a distance transform operation is applied to the first inspection image, to obtain a first transformed inspection image. Similarly, a distance transform operation is applied to the second inspection image, to obtain a second transformed inspection image. A comparison between data informative of the first transformed inspection image and data informative of the second transformed inspection image enables registration between the first inspection image and the second inspection image.

Figure 1:
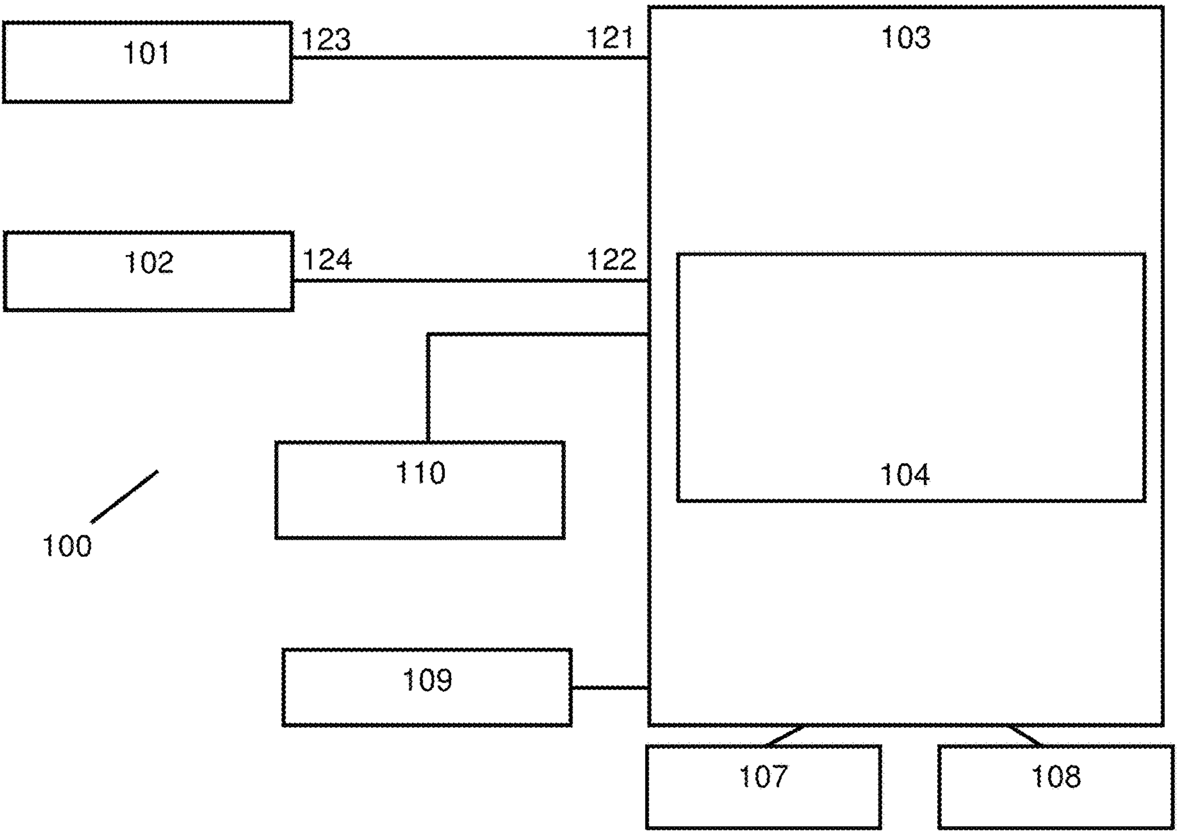
FIG. 1 illustrates a generalized block diagram of an examination system in accordance with certain embodiments of the presently disclosed subject matter.

Attention is drawn to FIG. 1 illustrating a functional block diagram of an examination system in accordance with certain embodiments of the presently disclosed subject matter. The examination system 100 illustrated in FIG. 1 can be used for examination of a specimen (e.g., of a wafer and/or parts thereof) as part of the specimen fabrication process. The illustrated examination system 100 comprises computer-based system 103 capable of automatically determining metrology-related and/or defect-related information using images obtained during specimen fabrication. System 103 can be operatively connected to one or more low-resolution examination tools 101 and/or one or more high-resolution examination tools 102 and/or other examination tools. The examination tools are configured to capture images and/or to review the captured image(s) and/or to enable or provide measurements related to the captured image(s). System 103 can be further operatively connected to CAD server 110 and data repository 109.

System 103 includes a processing circuitry 104, which includes a processor (or a plurality of processors) and a memory (or a plurality of memories). The processing circuitry 104 is configured to provide all processing necessary for operating the system 103 as further detailed hereinafter (see methods described in FIGS. 2A, 3A, 4A, 4B, 5A, 5C, 6A, 6B, 6D, 7A, 7C, 8A and 8C, which can be performed at least partially by system 103).

System 103 is configured to receive input data. Input data can include data (and/or derivatives thereof and/or metadata associated therewith) produced by the examination tools and/or data produced and/or stored in one or more data repositories 109 and/or in CAD server 110 and/or another relevant data depository. It is noted that input data can include images (e.g., captured images, images derived from the captured images, simulated images, synthetic images, etc.) and associated numeric data (e.g., metadata, hand-crafted attributes, etc.). It is further noted that image data can include data related to a layer of interest and/or to one or more other layers of the specimen.

By way of non-limiting example, a specimen can be examined by one or more low-resolution examination machines 101 (e.g., an optical inspection system, low-resolution SEM, etc.). The resulting data (low-resolution image data 121), informative of low-resolution images of the specimen, can be transmitted—directly or via one or more intermediate systems—to system 103. Alternatively, or additionally, the specimen can be examined by a high-resolution machine 102, such as a scanning electron microscope (SEM) or Atomic Force Microscopy (AFM)). The resulting data (high-resolution image data 122) informative of high-resolution images of the specimen, can be transmitted—directly, or via one or more intermediate systems—to system 103.

It is noted that image data can be received and processed together with metadata (e.g., pixel size, text description of defect type, parameters of image capturing process, etc.) associated therewith.

Upon processing the input data (e.g. low-resolution image data and/or high-resolution image data, together with other data as, for example, design data, synthetic data, etc.), system 103 can send instructions 123 and/or 124 to any of the examination tool(s), store the results (such as registration data between an image of a specimen and a design image) in a storage system 107, render the results via a computer-based graphical user interface GUI 108 and/or send the results to an external system.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines, and so on. In some cases, the same examination tool can provide low-resolution image data and high-resolution image data. In some cases, at least one examination tool can have metrology capabilities.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least some examination tools 101 and/or 102, data repositories 109, storage system 107 and/or GUI 108 and/or CAD server 110 can be external to the examination system 100 and operate in data communication with system 103. System 103 can be implemented as stand-alone computer(s) to be used in conjunction with the examination tools. Alternatively, the respective functions of the system can, at least partly, be integrated with one or more examination tools.

Figure 2A:
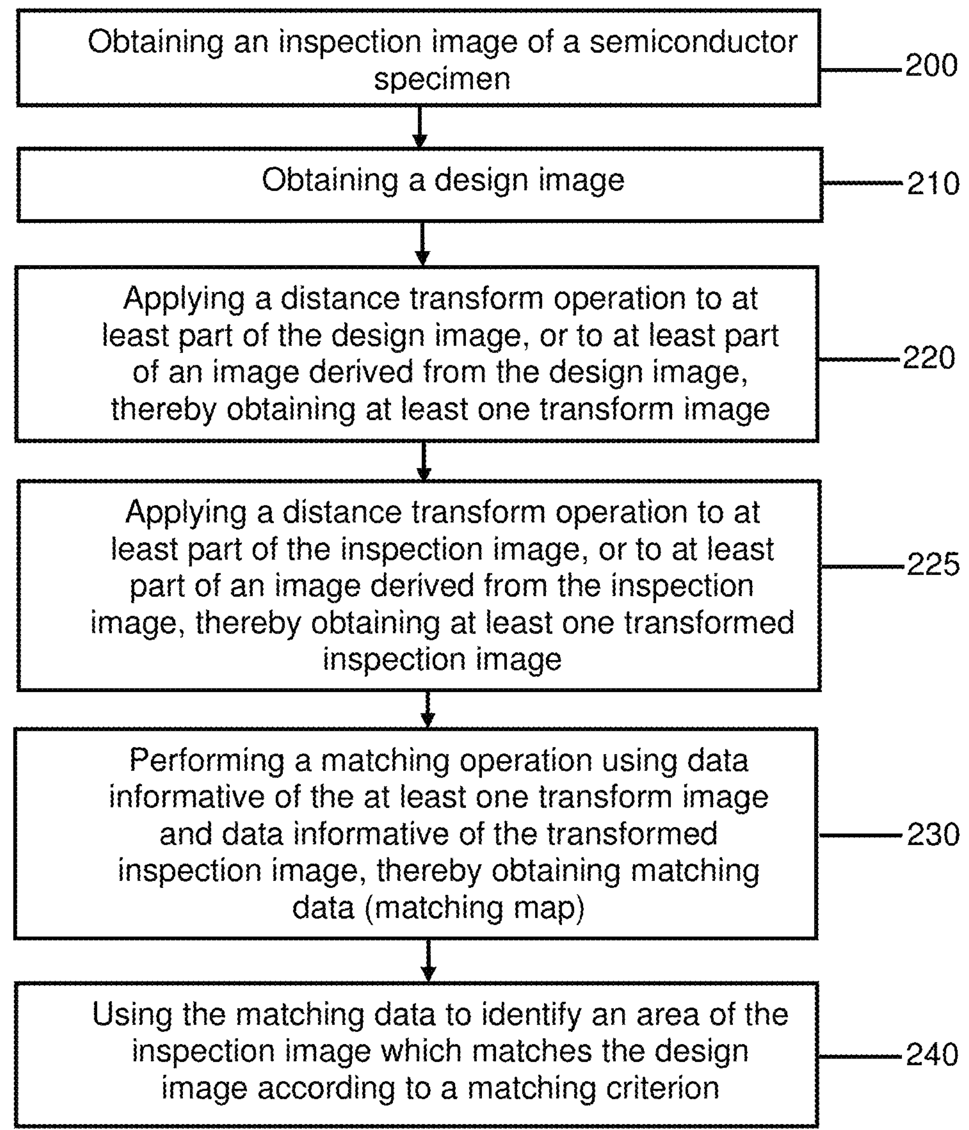
FIG. 2A illustrates a generalized flow-chart of a method of registering a design image with an inspection image.
Figure 2B:
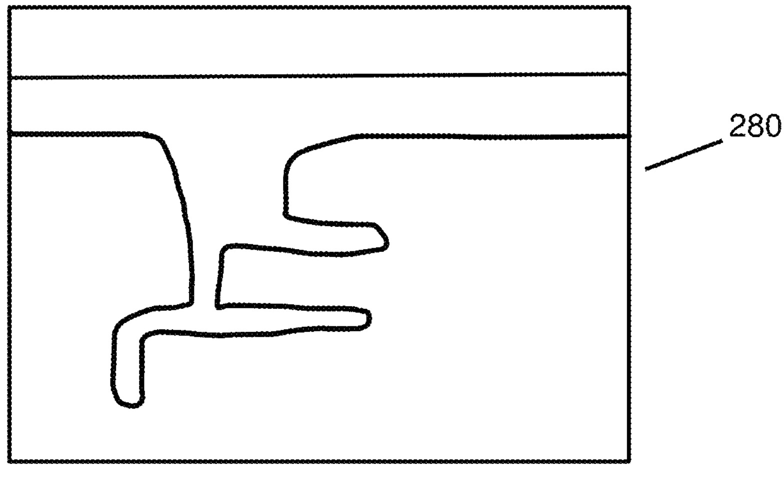
FIG. 2B illustrates a non-limitative example of an inspection image of a specimen.

Attention is now drawn to FIG. 2A, which describes a method of determining matching (also called registration) between an inspection image of a semiconductor specimen and a design image, according to some examples of the invention.

The method of FIG. 2A includes obtaining (operation 200) an inspection image of a specimen. The inspection image can be acquired by an examination tool (see references 101 and 102 in FIG. 1). In some examples, the examination tool is a SEM. This is not limitative.

The method of FIG. 2A further includes obtaining (operation 210) at least one design image of the specimen. In some examples, the design image has been generated based on design data. For example, the design image can be generated using CAD data (e.g., by rastering CAD data). In some examples, the design image can be a binary image or a grey level image. In some examples, the design image can be obtained by simulation or can be derived from a real image (e.g., a SEM image).

Figure 2C:
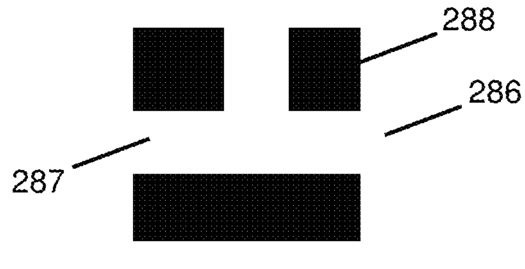
FIG. 2C illustrates a non-limitative example of a design image associated with a specimen.

The design image can include various geometrical shapes which represent structural elements, such as contact holes, transistors, gates, etc. (this list is not limitative). The structural elements of the design image are designated hereinafter as "design structural elements" and are generally associated with the desired dimensions and/or shapes which need to be manufactured on the specimen. FIG. 2C illustrates a non-limitative example of a design image 286, which includes structural element(s) 287 and background area(s) 288.

In some examples, at least one dimension (width and/or length) of the design image is smaller than the corresponding dimension of the inspection image. This can occur for example when the design image is only a fraction of the full design image used to design the specimen. In other examples, the dimensions (width and length) of the design image are the same as those of the corresponding dimensions of the inspection image. In other examples, the dimensions (width and length) of the design image are larger than the corresponding dimensions of the inspection image.

In some examples, the design image can be informative of a reference area (e.g., die, cell, etc.) of a specimen (including desired design structural element(s) to be manufactured on the specimen).

The inspection image (SEM image) is informative of a given area of a semiconductor specimen. The inspection image can be informative of a plurality of defects associated with the given area. The given area can meet a similarity criterion with regard to the reference area and can belong to the same or to a different semiconductor specimen. The similarity criterion can define, for example, that the given area and the reference area correspond to the same physical components or to similar zones of the semiconductor specimen (e.g., similar dies, cells, etc.).

The method of FIG. 2A further includes applying (operation 220) a distance transform operation to at least part of the design image, or to at least part of an image derived from the design image, thereby obtaining at least one transform image.

According to some examples, a distance transform (DT) algorithm operates on an input image consisting of featured pixels and non-featured pixels. It can output a distance map or distance matrix or distance image, where each cell of the distance map (or of the distance matrix or of the distance image) matches a pixel of the input image and contains a value indicating the distance to the nearest featured pixel. In some examples, the distance transform algorithm can be used to determine, for each pixel located in the interior of a structural element of the design image, the distance to the closest contour of the structural element. The distance can be computed according to various metrics known in the art, such as (but not limited to) Euclidean distance (see https://en.wikipedia.org/wiki/Euclidean_distance), Taxicab geometry (also known as City block distance or Manhattan distance—see https://en.wikipedia.org/wiki/Taxicab_geometry), or Chebyshev distance (see https://en.wikipedia.org/wiki/Chebyshev_distance).

Figure 2D:
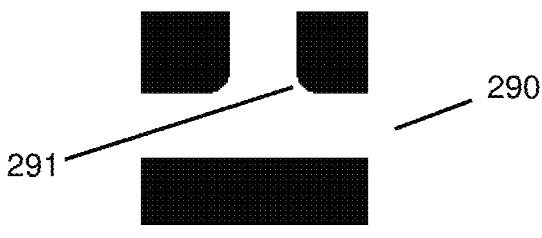
FIG. 2D illustrates a non-limitative example of a design image associated with a specimen, after a rounding operation.

As mentioned above with reference to operation 220, a distance transform operation can be applied to an image derived from the design image. The image derived from the design image can correspond to the design image after processing of the image by an image processing algorithm. This image processing can include, e.g., a rounding operation (or other relevant image processing operation(s)) in which the corners of the design structural elements have been rounded. Image 290 in FIG. 2D is a non-limitative example of the design image 286 after a rounding operation of the corners of the design structural elements 287 (see rounded corners 291).

Figure 2E:
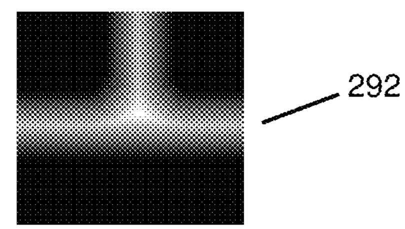
FIG. 2E illustrates a non-limitative example of a transform image obtained based on a design image.

FIG. 2E depicts an example of a transform image 292 obtained after application of a distance transform operation to the image 290, in accordance with operation 220 of FIG. 2A.

The method of FIG. 2A further includes applying (operation 225) a distance transform operation to at least part of the inspection image (e.g., SEM image), or to at least part of an image derived from the inspection image, thereby obtaining a transformed inspection image (not represented).

Operation 225 can include determining edges of the structural elements within the inspection image or within an image derived from the inspection image (using an image processing algorithm, or a segmentation algorithm, or any other adapted means), and applying a distance transform operation to at least part of the inspection image. In some examples, a distance transform operation is applied to all or most pixels of the inspection image which do not belong to the edges (or to all or most pixels of the image derived from the inspection image, which do not belong to the edges). According to some examples, the distance transform operation enables determining the distance of each pixel of the inspection image (or of an image derived from the inspection image) to the closest edge.

The method of FIG. 2A further includes performing (operation 230) a matching operation using data informative of the at least one transform image and data informative of the transformed inspection image. In particular, it can be attempted to find which area of the transformed inspection image (SEM image after distance transform operation) best matches the transform image (design image after distance transform operation).

According to some examples, the transform image (or an image derived thereof) can be "displaced" over the transformed inspection image (or an image derived therefore), and, at each location, a comparison can be performed to determine the level of matching. Note that this "displacement" can be achieved using a mathematical operator, such as a convolution. This comparison enables obtaining matching data. According to some examples, the matching data can include a matching map which indicates the level of matching between the transform image and the transformed inspection image at various locations within the transformed inspection image. In some examples, the matching map includes a plurality of values indicative of the level of correlation/level of matching at each location, and it is possible to perform an interpolation between these values in order to increase the resolution.

For each area in the transformed inspection image, the matching map can indicate the level of matching between the transform image and the transformed inspection image. Note that the level of matching of an area of the transformed inspection image with the transform image reflects the level of matching between the same area of the inspection image with the design image. This therefore enables registering the design image with the inspection image.

The method further includes (operation 240) using the matching data to identify an area of the inspection image which matches the design image according to a matching criterion. The matching criterion can for example define that the area of the inspection image which best matches the design image (according to the method of FIG. 2A) corresponds to the searched area. Note that this match may be not fully perfect, since the manufactured specimen generally differs from the design data due to errors in the manufacturing process. For example, assume that a given area with a given location has been identified in the matching map as corresponding to the best match. The area of the inspection image corresponding to this given location therefore includes the pixels of the inspection image for which there is the most accurate overlay with the design image.

Figure 2F:
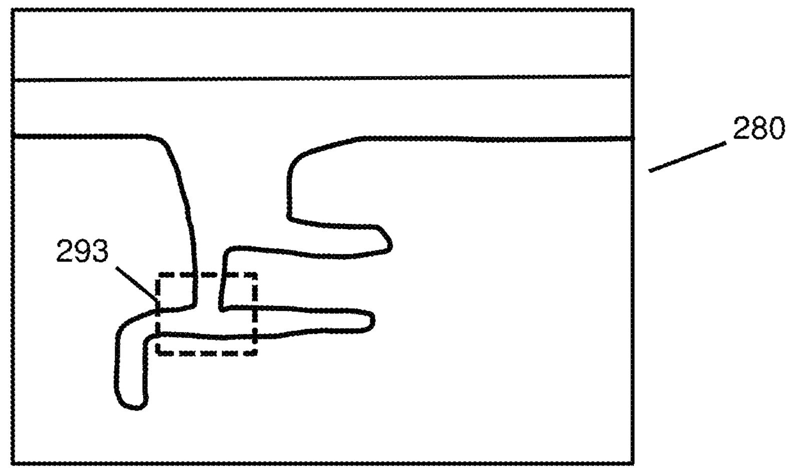
FIGS. 2F and 2G illustrate non-limitative examples of a possible output of the method of FIG. 2A.
Figure 2G:
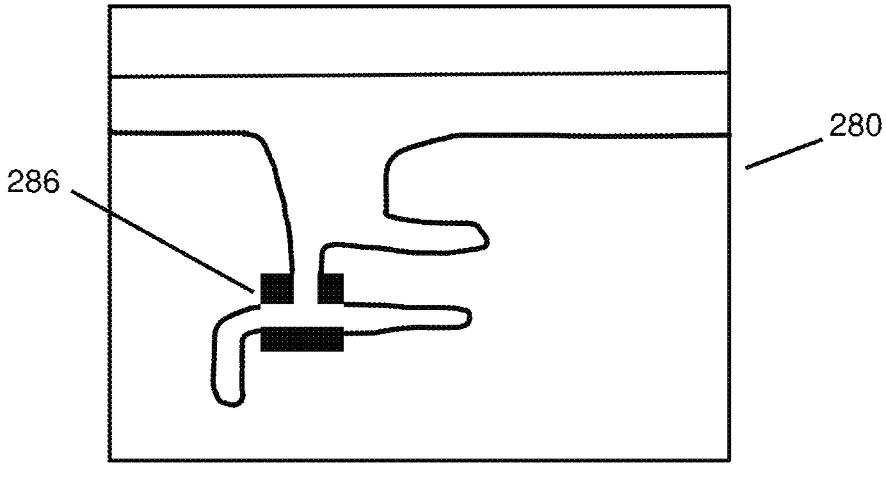

A non-limitative example is provided in FIG. 2F, in which the matching map indicates that the area 293 of the inspection image 280 best matches the design image 286. This is also visible in FIG. 2G, in which the design image 286 has been superimposed on the area 293 of the inspection image 280, in order to show that an accurate overlay is obtained between the two images 280, 286 in the area 293.

The method of FIG. 2A enables a registration between the design image and the inspection image acquired by the examination tool. Note that this registration can be used in various applications (metrology measurements, defect detection, recipe generation, etc.). Non-limitative examples of applications are provided hereinafter.

In some embodiments, it can be desired to displace the field of view of the examination tool towards a particular location of the specimen. This can be needed e.g., in order to perform metrology measurements at this particular location and/or to determine defects at this particular location. In some cases, this particular location can be identified in the design image, and the registration described according to the various examples of the present invention enables finding the actual location in the inspection image (and therefore in the specimen itself) which matches this particular location. The field of view of the examination tool can then be oriented towards this particular location.

In some embodiments, the registration can be used in order to compare the inspection image with the design image. This comparison can be used to detect defects and/or to detect a difference between one or more dimensions of the specimen and one or more corresponding dimensions in the design image, or for other required applications.

In some embodiments, the registration can be used to determine various patterns in the inspection image and to generate a recipe for the examination tool based on this determination.

Figures 3A, 3B:
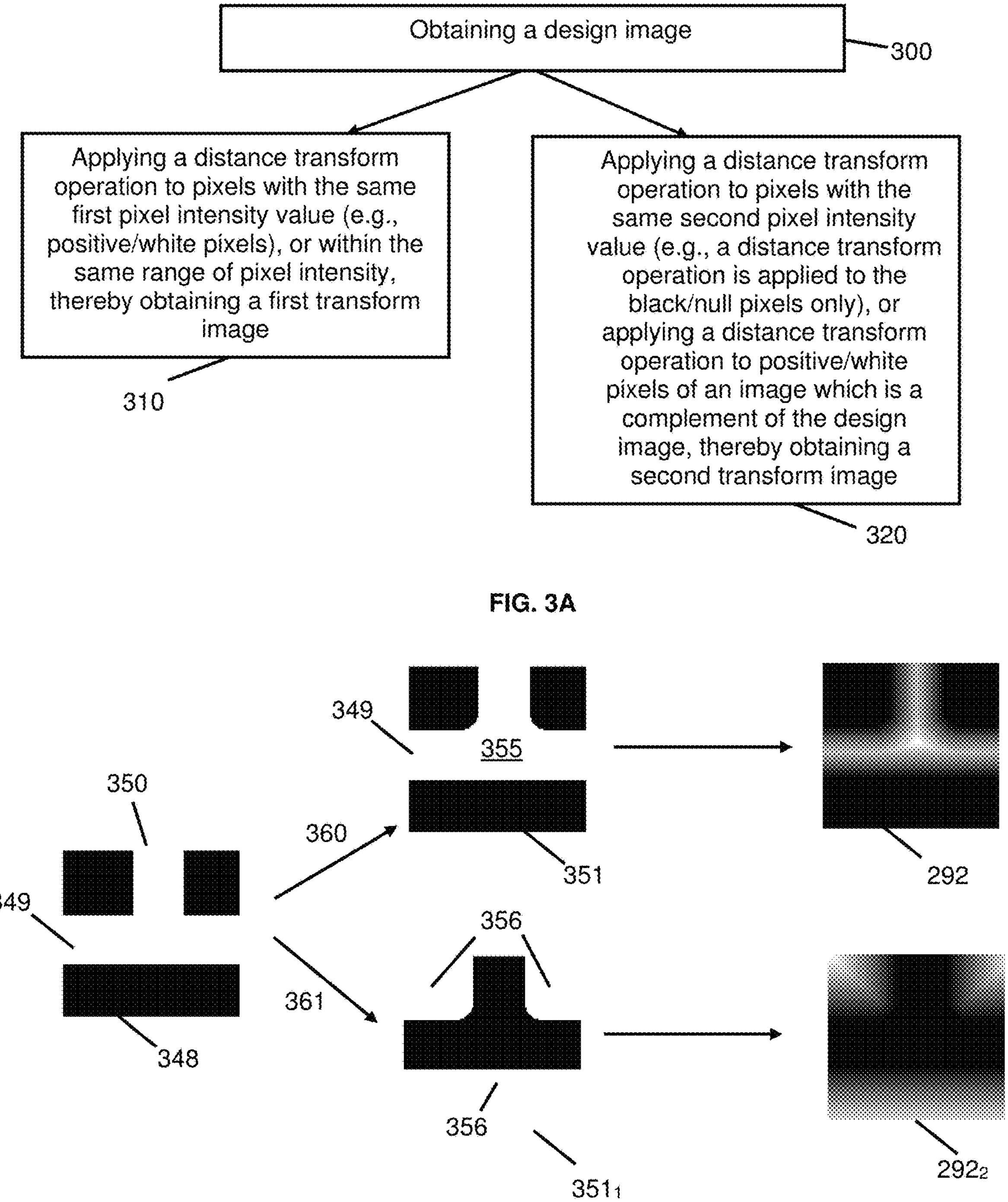
FIG. 3A illustrates a generalized flow-chart of a method of generating a transform image based on the design image.
FIG. 3B illustrates a non-limitative example of the method of FIG. 3A.

Attention is now drawn to FIGS. 3A and 3B, which describe methods for generating images usable in the process of registering the design image with the inspection image, according to some examples of the invention.

It has been mentioned above with reference to operation 220 that at least one transform image is obtained (see for example reference 292 in FIG. 2E). FIG. 3A illustrates two different ways for obtaining the transform image based on a design image. Note that generation of the transform image is not limited to the two ways provided in FIG. 3A.

Assume that a design image has been obtained (operation 300, similar to operation 210), which is informative of one or more design structural elements.

As explained hereinafter, the method of FIG. 3A can include applying a distance transform operation to pixels located within the design structural element(s) of the design image, or of an image derived from the design image, in order to obtain a first transform image, and applying a distance transform operation to pixels located outside of the design structural elements of the design image, or of an image derived from the design image, thereby obtaining a second transform image.

In some examples, it is unknown which pixels are located within the design structural elements of the design image, and which pixels are located outside the design structural elements (and therefore correspond to space between features). The method can therefore include processing the design image (or an image derived from the design image) as follows:

- applying (operation 310) a distance transform operation to pixels with the same first pixel intensity value, or within the same range of pixel intensity (e.g., a distance transform operation is applied to the white pixels only, or to the pixels with a positive pixel intensity value only). A first transform image is obtained;
- applying (operation 320) a distance transform operation to pixels with the same second pixel intensity value (e.g., a distance transform operation is applied to the black pixels only), or applying a distance transform operation to white pixels of an image which is a complement of the design image. A second transform image is obtained.

Operations 310 and 320 enable applying a distance transform operation to pixels located within the design structural elements of the design image (to obtain a transform image), and a distance transform operation to pixels located outside of the design structural elements of the design image (to obtain another transform image). As mentioned above, it can occur that it is unknown which pixels correspond to the interior of the elements, and which pixels corresponds to space located between the elements.

An example of operation 310 is illustrated in FIG. 3B. Assume that a design image 350 has been obtained, which is informative of design structural element(s) 349 and of background area(s) 348. As visible in the upper path 360 of FIG. 3B, the design image 350 can be transformed into the image 351 (in which the corners of the design structural elements 349 have been rounded-note that this operation is optional). A distance transform operation can be applied to the pixels 355, and not to the pixels located in the background area(s) 348, in order to obtain the first transform image 292. Note that it is also possible to apply the distance transform operation to the pixels 355 located within the design structural elements 349 of the design image 350, even if the corners of the design structural elements 349 have not been rounded.

According to some examples, the distance transform operation used at operation 310 determines, for each given pixel located within the interior of the design structural elements 349 of the image 351, the distance of the given pixel to the closest contour of the design structural elements 349 (which corresponds to the boundary between the pixels located within the interior of the design structural element(s) 349 and the pixels located on the contour or outside of the design structural element(s) 349, in background area(s) 348).

As mentioned above, operation 320 can include generating a complement of the design image, or of an image derived from the design image (that it to say that the pixels with a value equal to 1 are assigned a value equal to 0, and the pixels with a value equal to 0 are assigned a value equal to 1), and determining a distance transformation for the pixels with a positive value (with respect to the pixels with a null value). Note that generating the complement of the design image is not mandatory and it is possible to calculate the distance transform for the pixels which are different from the pixels used at operation 310.

A non-limitative example of operation 320 is illustrated in FIG. 3B, in which the design image 350 is transformed into the image $\mathbf{351}_1$ (see path 361). The image $\mathbf{351}_1$ is the complement of the design image 350. In addition, the corners of the design structural elements 349 have been rounded to obtain the image $\mathbf{351}_1$. This is however not mandatory.

A distance transform operation is applied to the positive pixels (with a value equal to 1) of the image 3511. Since the image $\mathbf{351}_1$ is the complement of the design image 350, the distance transform operation is applied to the pixels 356 which are located outside of the design structural elements 349. The second transform image $\mathbf{292}_2$ is obtained.

According to some examples, the distance transform used at operation 320 determines, for each given pixel located outside of the design structural elements 349 of the image 351, the distance of the given pixel to the closest pixel located within the design structural elements 349.

The method of FIGS. 3A and 3B therefore enables obtaining at least two types of transform images: a first transform image obtained by applying a distance transform operation to the pixels located within the design structural elements of the design image, and a second transform image obtained by applying a distance transform information to the pixels located outside of the design structural elements of the design image. As mentioned above, it can be unknown which pixels correspond to the interior of the design structural elements (inner pixels), and which pixels correspond to the outer part located between the design structural elements (outer pixels): however, since two transform images are generated (one based on the design image, and another based on the complement of the design image), one transform image necessarily results from the application of the distance transform operation to the inner pixels, and the other transform image results from the application of a distance transform operation to the outer pixels.

As explained hereinafter with reference to the method of FIG. 4A, it is possible to use one of these two types of transform images, or both of them, in order to determine matching data (enabling registration of the design image with the inspection image).

Figure 4A:
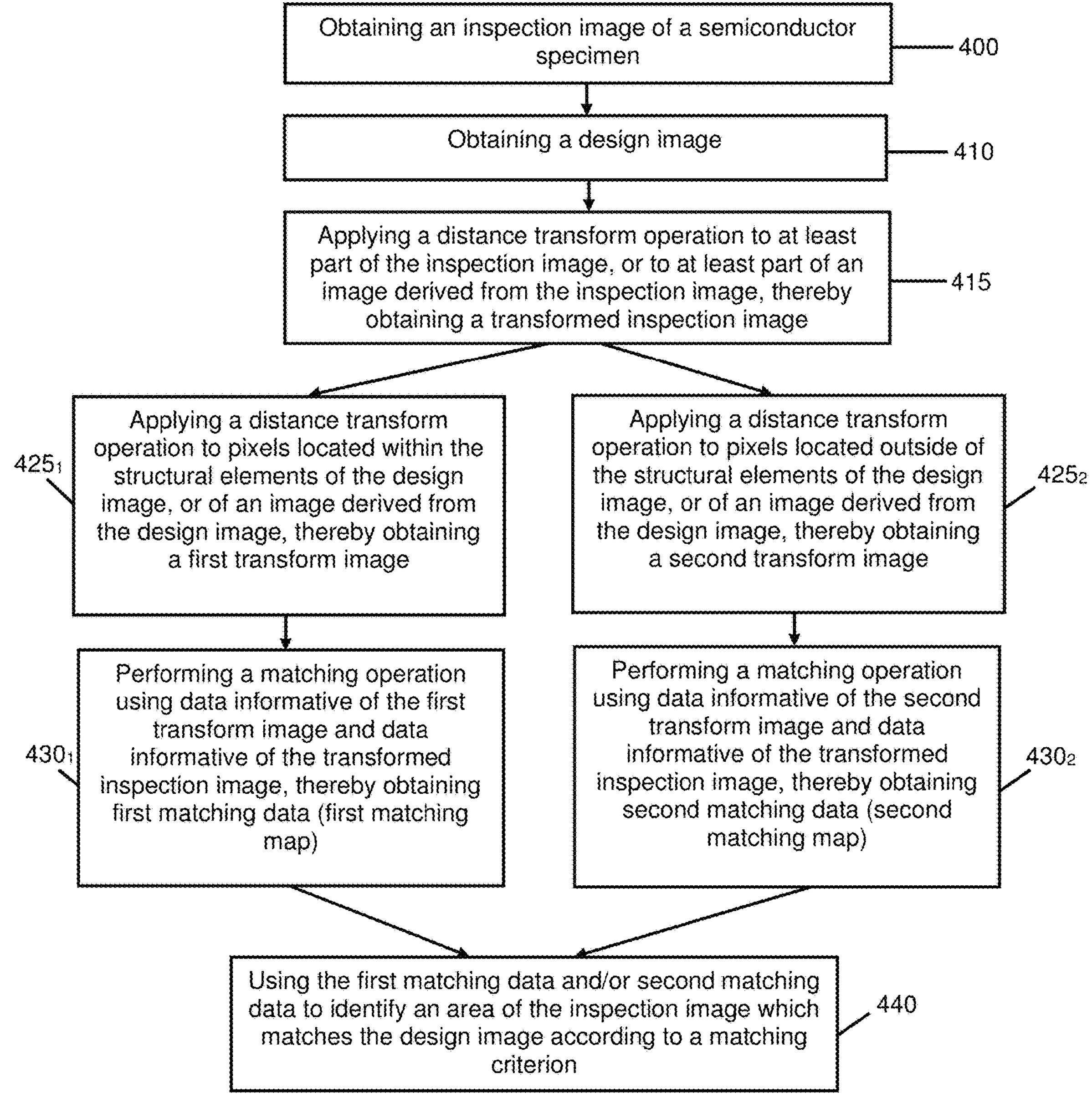
FIG. 4A illustrates a generalized flow-chart of another method of registering a design image with an inspection image.

The method of FIG. 4A includes obtaining (operation 400) an inspection image of a semiconductor specimen (operation 400, similar to operation 200). The method further includes obtaining a design image (operation 410, similar to operation 210).

The method of FIG. 4A includes applying (operation 415, similar to operation 225) a distance transform operation to at least part of the inspection image, or to at least part of an image derived from the inspection image, thereby obtaining a transformed inspection image.

According to some examples, the method of FIG. 4A includes:

- applying (operation $\mathbf{425}_1$) a distance transform operation to pixels with the same first pixel intensity value (e.g., positive/white pixels), or within the same range of pixel intensity, of the design image, or of an image derived from the design image, thereby obtaining a first transform image, and applying (operation $425_2$) a distance transform operation to pixels with the same second pixel intensity value (e.g., a distance transform operation is applied to the black/null pixels only), or applying a distance transform operation to positive/white pixels of an image which is a complement of the design image, thereby obtaining a second transform image.

With the method of FIG. 4A, one of the transform images has been obtained by applying a distance transform operation to pixels located within the design structural elements, and the other image has been obtained by applying a distance transform operation to pixels outside of the design structural elements.

According to some examples, the method of FIG. 4A further includes performing (operation $\mathbf{430}_1$) a matching operation using data informative of the first transform image and data informative of the transformed inspection image, thereby obtaining first matching data (first matching map). This first matching map can provide at least the following information: firstly, it can be used to determine which pixels of the inspection image match the best the pixels (best overlay) of the design image. Secondly, the first matching map is informative of whether one or more dimensions of at least one structural element have been increased with respect to one or more dimensions of a corresponding design structural element in the design image. In other words, the first matching map can indicate whether the structural element(s) have been widened in the specimen with respect to the design data. This will be discussed further hereinafter with reference e.g., to FIG. 4B.

According to some examples, the method includes performing (operation $\mathbf{430}_2$) a matching operation using data informative of the second transform image and data informative of the transformed inspection image, thereby obtaining second matching data (second matching map). This second matching map provides at least the following information: firstly, it can be used to determine which pixels of the inspection image match the best the pixels (best overlay) of the design image. Secondly, the second matching map is informative of whether one or more dimensions of at least one structural element have been reduced with respect to one or more dimensions of a corresponding design structural element in the design image. In other words, the second matching map indicates whether the structural element(s) have been narrowed in the specimen with respect to the design data. This will be discussed further hereinafter with reference e.g., to FIG. 4B.

According to some examples, the method further includes (operation 440) using the first matching data (e.g., first matching map) and/or the second matching data (e.g., second matching map) to identify an area of the inspection image which matches the design image according to the matching criterion (best overlay).

According to some examples, if the first matching data (e.g., first matching map) have been determined (but not the second matching data), operation 440 can include determining a given area in the first matching map which correspond to the best overlay (best level of match within the first matching map). The given area which is identified in the first matching map can be used to identify an area of pixels in the inspection image (with the same position as the given area in the first matching map). This area of pixels in the inspection image best matches the design image according to the matching criterion.

According to some examples, if the second matching data (e.g., second matching map) have been determined (but not the first matching data), operation 440 can include determining a given area in the second matching map which correspond to the best overlay (best level of match within the second matching map). The given area which is identified in the second matching map can be used to identify an area of pixels in the inspection image (with the same position as the given area in the second matching map). This area of pixels in the inspection image best matches the design image according to the matching criterion.

According to some examples, if both the first matching data and the second matching data have been determined, operation 440 can include determining a given area among the first matching map and the second matching map which corresponds to the best overlay. Each matching map provides a level of correlation/level of matching. A given area is determined, which is associated with the highest level of correlation/best level of matching among the two matching maps. In some cases, the given area may be identified in the first matching map. In other cases, the given area may be identified in the second matching map.

In addition, it is possible to use the first matching data (first matching map) and/or the second matching data (second matching map) to determine whether one or more structural elements of the inspection image have been widened or narrowed with respect to one or more corresponding design structural element(s) of the design image. This is illustrated in FIGS. 4B to 4F, described hereinafter.

Assume that both first matching data (first matching map 480) and second matching data (second matching map 481) have been determined at operation 460, using the method described in FIG. 4A.

Figure 4B:
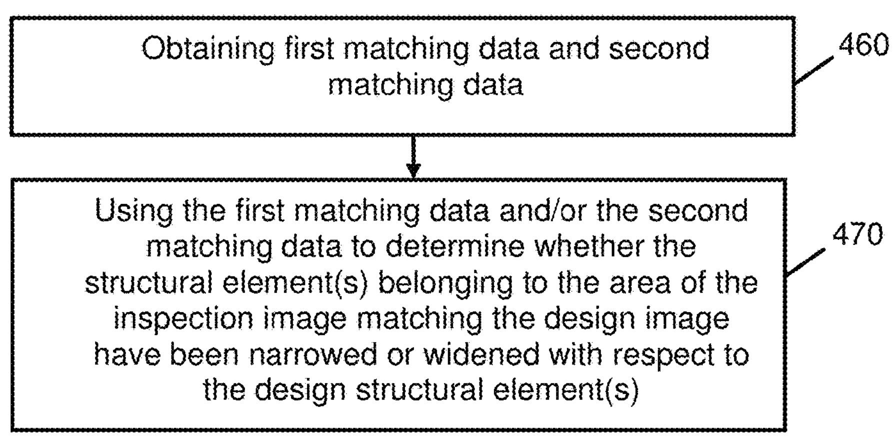
FIG. 4B illustrates a generalized flow-chart of a method of determining whether structural element(s) belonging to an area of the inspection image matching the design image have been narrowed or widened with respect to corresponding design structural element(s) of the design image.

The method of FIG. 4B includes using (operation 470) the first matching data (first matching map) and the second matching data (second matching map) to identify an area of the inspection image which matches the design image according to the matching criterion (best overlay). This can include determining an area which is associated with the highest level of correlation or correspondence, among the first matching map and the second matching map. Once this area has been identified, it can be understood also which transform image (the direct transform image, or the transform image obtained using a complement of the design image) matches the best the inspection image, and therefore, it can be understood (based on a comparison with the inspection image), which part of the design image corresponds to a feature ad which part of the transform image corresponds to a space between the features. Indeed, in the SEM image, it is known which pixels correspond to the inner area of the structural elements, and which pixels are located outside of the structural elements (space between the structural elements). Once the best overlay has been found (either in the first matching map or in the second matching map), this can be used to deduce which pixels of the design image corresponds to the inner area of the design structural elements, and which pixels of the design image are outside of the design structural elements.

When trying to register a design image with an inspection image (such as a SEM image), it can occur that it is unknown which part of the design image corresponds to the inner portion of structural elements of the design image, and which part of the design image corresponds to the outer portion of the structural elements of the design image. The method of FIG. 4B solves this problem by using two transform images: the first transform image, which has been obtained using a distance transform operation to pixels located within the structural elements of the design image, or of an image derived from the design image, and a second transform image, which has been obtained using a distance transform operation to pixels located outside of the structural elements of the design image, or of an image derived from the design image (or by using a distance transform operation to the complement of the design image). Both transform images are correlated/compared to the inspection image (e.g., SEM image).

Figure 4C:
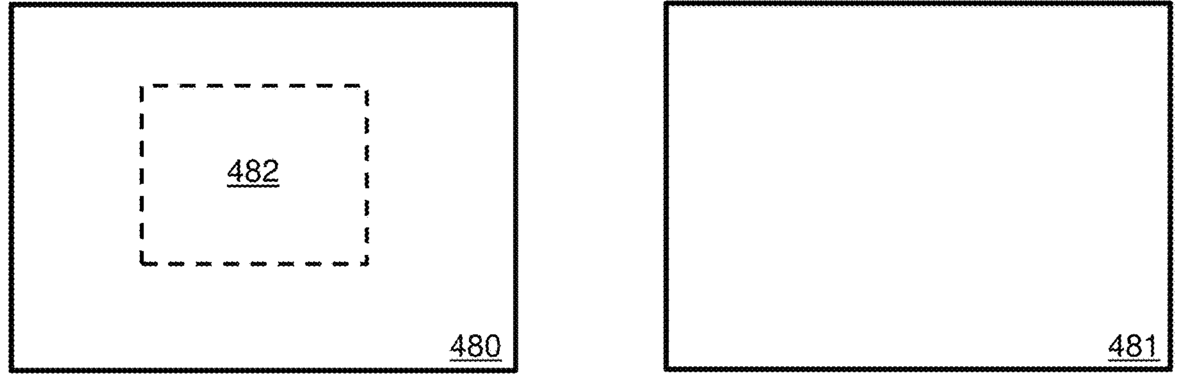
FIGS. 4C to 4F illustrate non-limitative examples of the method of FIG. 4A.
Figure 4D:
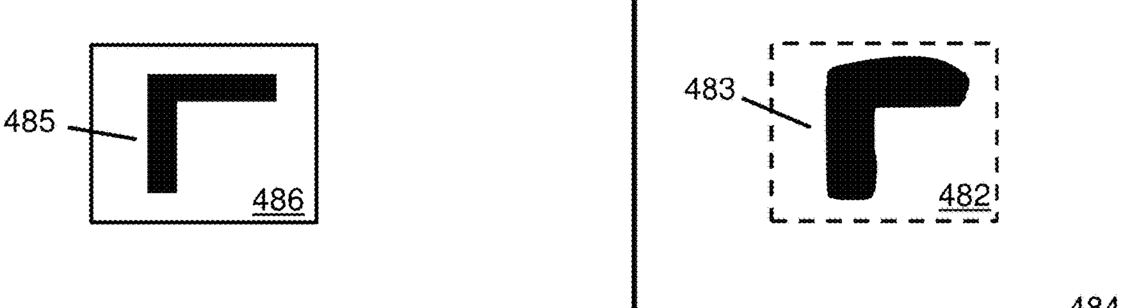

A non-limitative example is illustrated in FIGS. 4C and 4D, in which the area 482 (corresponding to the best overlay) has been identified in the first matching map 480 (and not in the second matching map 481). The area 482 is used to identify a corresponding area 482 of pixels in the inspection image 484. The first matching map can be used to determine whether one or more structural element(s) 483 present in this area 482 of the inspection image 484 have been widened or narrowed with respect to the corresponding one or more design structural element(s) 485 of the design image 486. In this example, the one or more structural elements 483 have been widened with respect to the corresponding one or more design structural elements 485 of the design image 486.

Figure 4E:
Figure 4E:
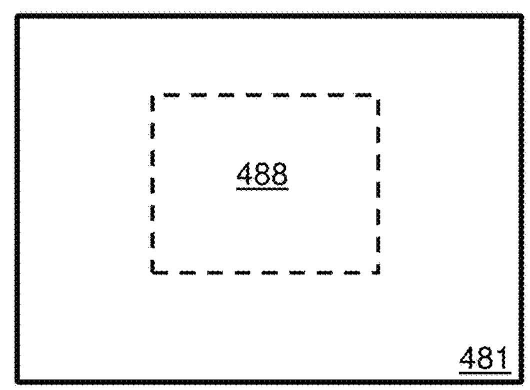
Figure 4F:
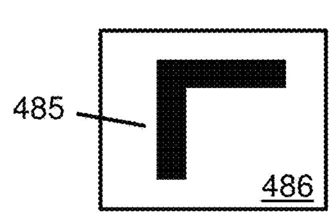
Figure 4F:
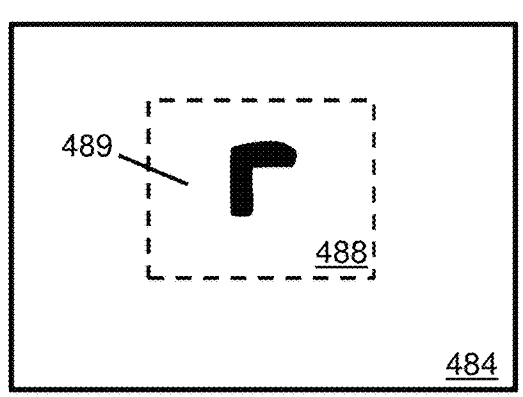

Another example is illustrated in FIGS. 4E and 4F, in which the area 488 (corresponding to the best overlay) has been identified in the second matching map 481 (and not in the first matching map 480). The area 488 is used to identify a corresponding area 488 of pixels in the inspection image 484. The second matching map 481 can be used to determine whether one or more structural element(s) 489 present in this area 488 of the inspection image 484 have been widened or narrowed with respect to the corresponding one or more design structural element(s) 485 of the design image 486. In this example, the one or more structural elements 489 have been narrowed with respect to the corresponding one or more design structural elements 485 of the design image 486.

Figure 5A:
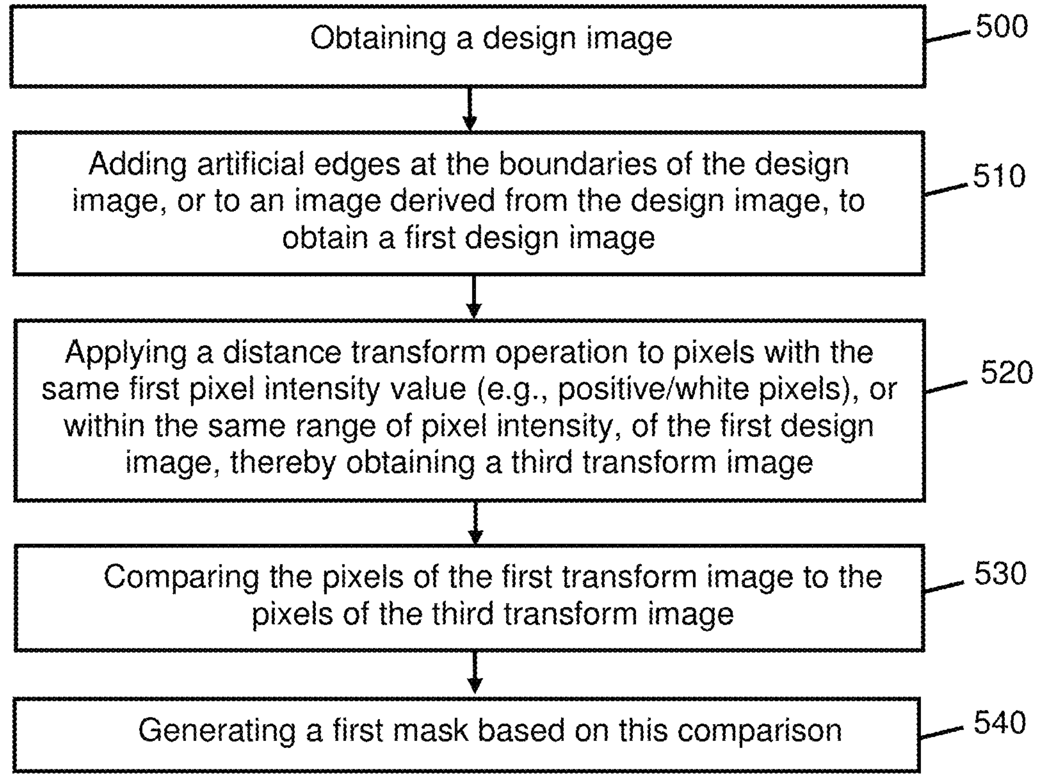
FIG. 5A illustrates a generalized flow-chart of a method of generating a first mask usable in the process of registering a design image with an inspection image.
Figure 5B:
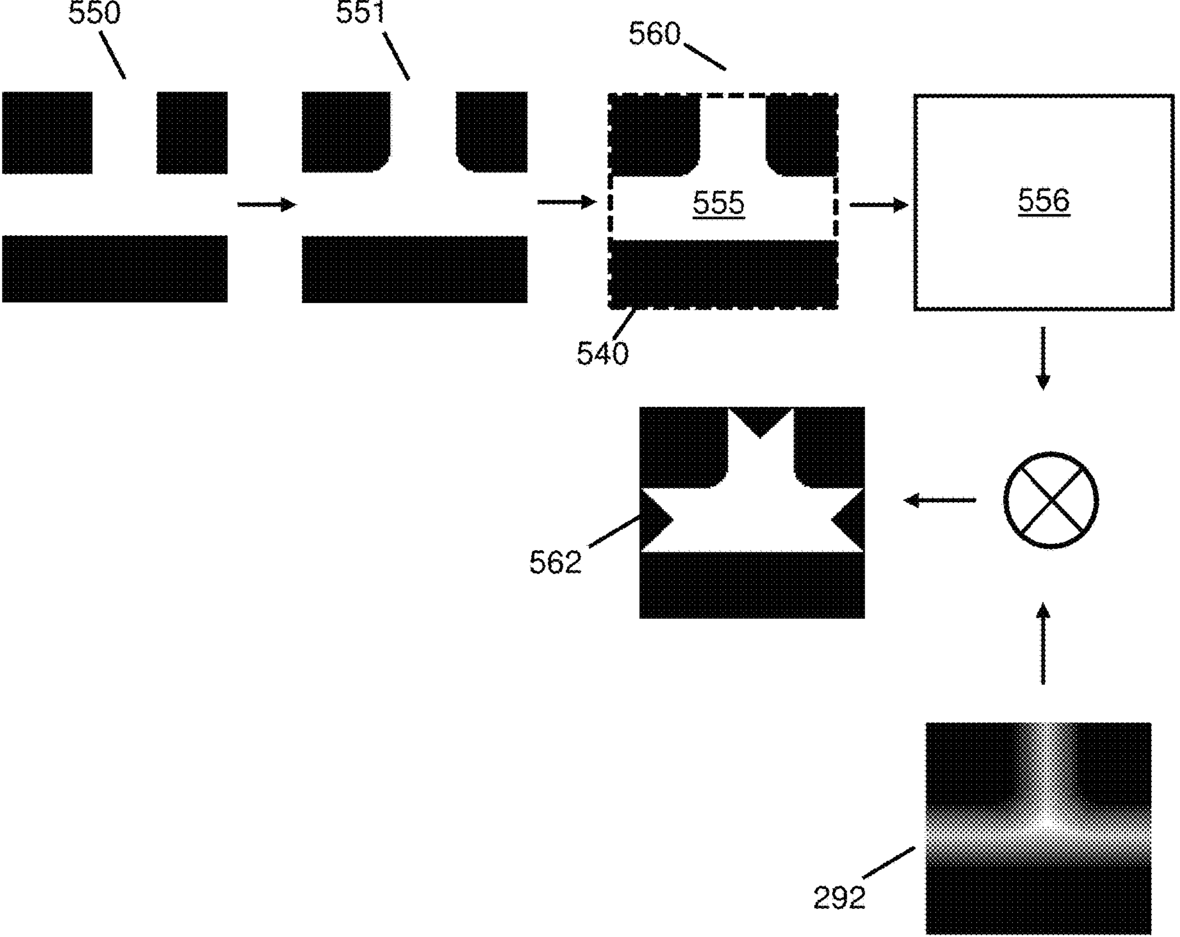
FIG. 5B illustrates a non-limitative example of the method of FIG. 5A.

Attention is now drawn to FIGS. 5A and 5B, which depict a method of generating a first mask based on the design image, which can be used to register the design image with the inspection image, according to some examples of the invention.

The method of FIG. 5A includes obtaining (operation 500) a design image (see 550 in FIG. 5C) based on design data. Operation 500 is similar to operations 210 and 410.

The method of FIG. 5A further includes (operation 510) adding artificial edges at the boundaries of the design image, or of an image derived from the design image, to obtain a first design image. The artificial edges can correspond to pixels with a positive value (e.g., equal to 1) which simulate the presence of features delimiting the outer perimeter of the image. For example, if the design image has a rectangle or square shape, the artificial edges correspond to a rectangle or a square, which “closes” the design image. This is not limitative.

An example of operation 510 is depicted in FIG. 5B, in which the artificial edges 540 are added to the design image 551 (obtained after rounding of the corners of the structural elements of the design image 550), in order to obtain the first design image 560. Note that the rounding operation is optional.

The method includes (operation 520) applying a distance transform operation to pixels with the same first pixel intensity value (e.g., positive/white pixels), or within the same range of pixel intensity, of the first design image 560, thereby obtaining a third transform image.

The method further includes comparing (operation 530) the pixels of the first transform image 292 (generated e.g., at operation 310 in FIG. 3A) with the pixels of the third transform image 556, and, based on this comparison, generating a first mask (binary mask-see reference 562). According to some examples, in the first mask 562, the pixels of the first transform image 292 which have the same value as the pixels of the third transform image 556 are assigned a positive value (e.g., 1), whereas the pixels of the first transform image 292 which have a different value from the pixels of the third transform image 556 are assigned a null value (operation 540).

In some examples, the first mask can be used as a mask to select only a subset of the pixels of the first transform image (used in the registration process between the design image and the inspection image, as visible e.g., in FIG. 4A). In particular, the first mask can be used to select the pixels of the first transform image which are the most reliable, thereby improving the registration process between the design image and the inspection image. Indeed, it can occur that the design image which is obtained (e.g., from the manufacturer of the specimen) in order to be registered with the inspection image of the specimen, is not the full design image used to design the specimen, but only a fraction of this full design image. When a distance transform operation is applied on the design image (which is not the full design image), as mentioned e.g., with reference to operations 220, 300 and 415, the method “assumes” that there are not any features or structural elements outside of the design image. However, this hypothesis may be inaccurate, and therefore this can introduce uncertainties in the distance transform operation, and, in turn, in the registration process. In order to alleviate this drawback, artificial edges can be added as explained above to generate a first mask, and this first mask can be used to keep the most reliable pixels of the design image and filter out the pixels of the design image which may introduce uncertainties in the registration process.

Figure 5C:
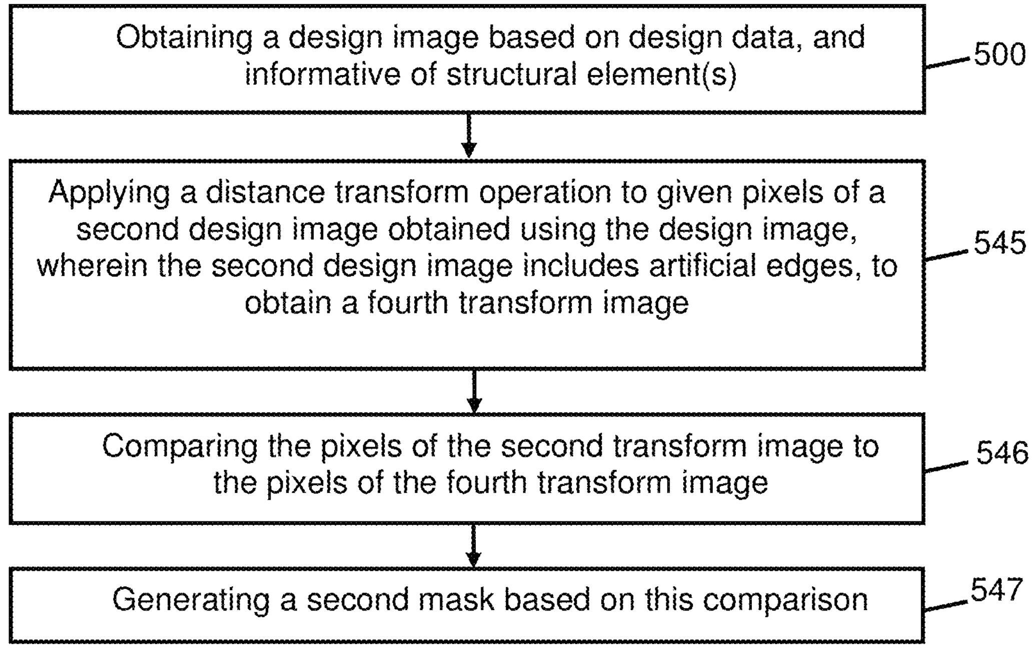
FIG. 5C illustrates a generalized flow-chart of a method of generating a second mask usable in the process of registering a design image with an inspection image.

Attention is now drawn to FIG. 5C, which describes a method of generating a second mask based on the design image, which can be used to register the design image with the inspection image, according to some examples of the invention. Note that the second mask can be generated in addition to the first mask, or alternatively to the first mask.

The method of FIG. 5C includes obtaining (operation 500) a design image (see 550 in FIG. 5D) based on design data. The design image is informative of one or more structural elements.

The method of FIG. 5C further includes (see operation 545) applying a distance transform operation to given pixels of a second design image obtained using the design image, wherein the second design image includes artificial edges, and the given pixels are located outside of the structural elements. A fourth transform image is obtained.

According to some examples, operation 545 includes applying a distance transform operation to pixels with the same second pixel intensity value (e.g., a distance transform operation is applied to the black/null pixels only).

According to some examples, operation 545 can include generating the complement of the design image (this can include assigning to the pixels with a value equal to 1, a value equal to 0, and to the pixels with a value equal to 0, a value equal to 1), or of a given image derived from the design image (such as after rounding of the corners), and adding artificial edges to the complement of the design image, or to the complement of the given image, to obtain the second design image. A distance transform operation can then be applied on the pixels of the second design image which have a positive value (these pixels are located outside of the structural element(s)).

Figure 5D:
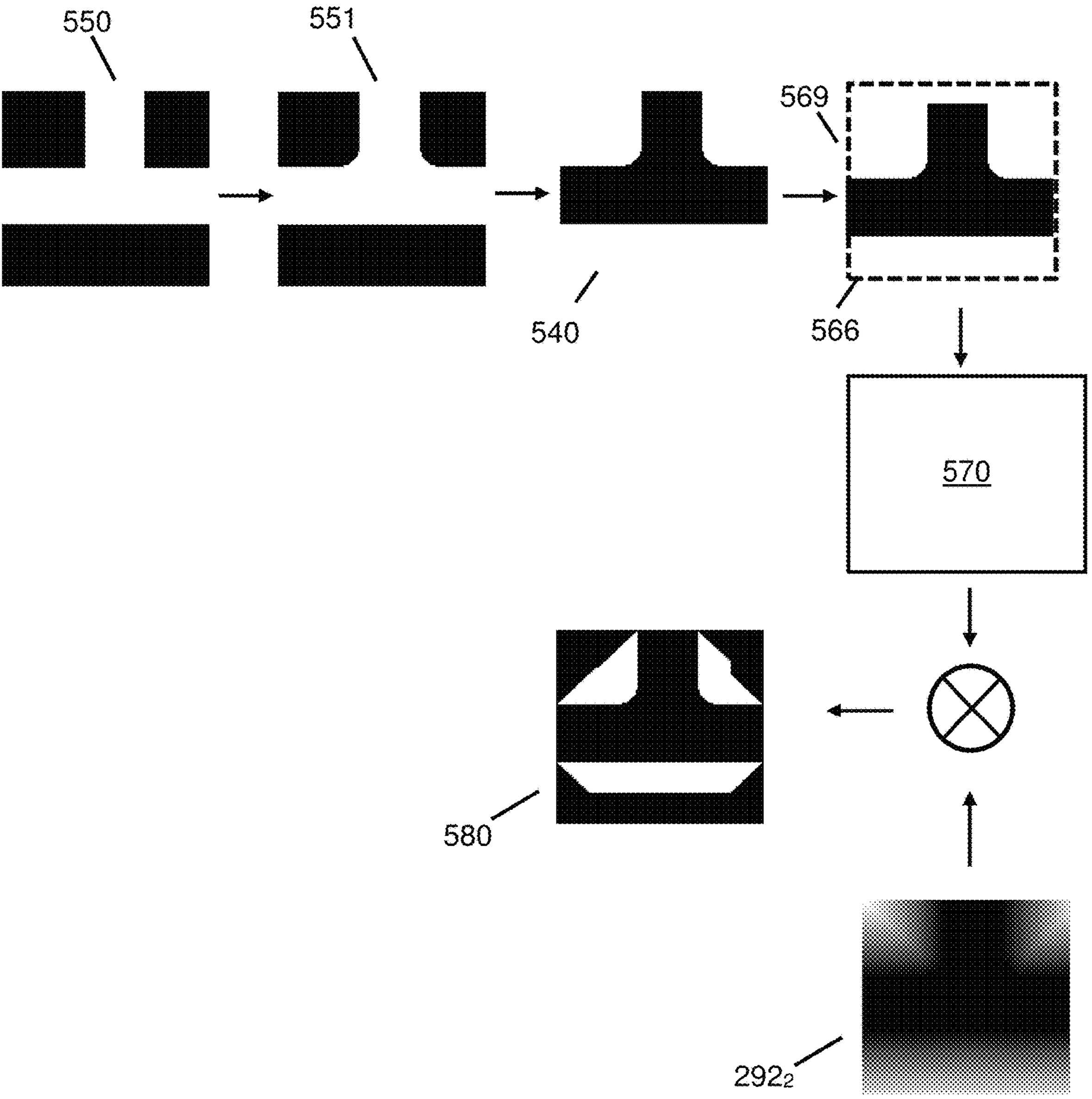
FIG. 5D illustrates a non-limitative example of the method of FIG. 5C.

An example of operation 545 is illustrated in FIG. 5D. The design image 550 is converted into the image 551 after rounding of the corners of the structural element(s) present in the design image 550. Note that this rounding operation is optional. Image 540 is generated, which corresponds to the complement of image 551. Artificial edges 566 are added at the boundaries of image 540, to obtain image 569. A distance transform operation is applied to the pixels of image 569 with a positive value (these pixels are located outside of the structural element(s) of the design image 550/551), to obtain the fourth transform image 570.

The method of FIG. 5C further includes comparing (operation 546) the pixels of the second transform image $\mathbf{292_2}$ (generated e.g., at operation 320 in FIG. 3A) with the pixels of the fourth transform image 570, and, based on this comparison, generating a second mask (binary mask-see reference 580). According to some examples, in the second mask 580, the pixels of the second transform image $\mathbf{292_2}$ which have the same value as the pixels of the fourth transform image 570, are assigned a positive value (e.g., 1), whereas the pixels of the second transform image $\mathbf{292_2}$ which have a different value from the pixels of the fourth transform image 570, are assigned a null value (operation 547).

In some examples, the second mask can be used as a mask to select only a subset of the pixels of the second transform image (used in the registration process between the design image and the inspection image, as visible e.g., in FIG. 4A). In particular, as explained above with respect to the first mask, the second mask can be used to select the pixels of the second transform image which are the most reliable, thereby improving the registration process between the design image and the inspection image.

Attention is now drawn to FIG. 6A to 6E.

It has been described that a first transform image and/or a second transform image can be generated based on the design image, in order to determine an area of the inspection image matching the design image (registration). In particular, as explained for example in FIG. 4A, data informative of the first transform image and/or of the second transform image can be compared to data informative of the transformed inspection image.

Figure 6A:
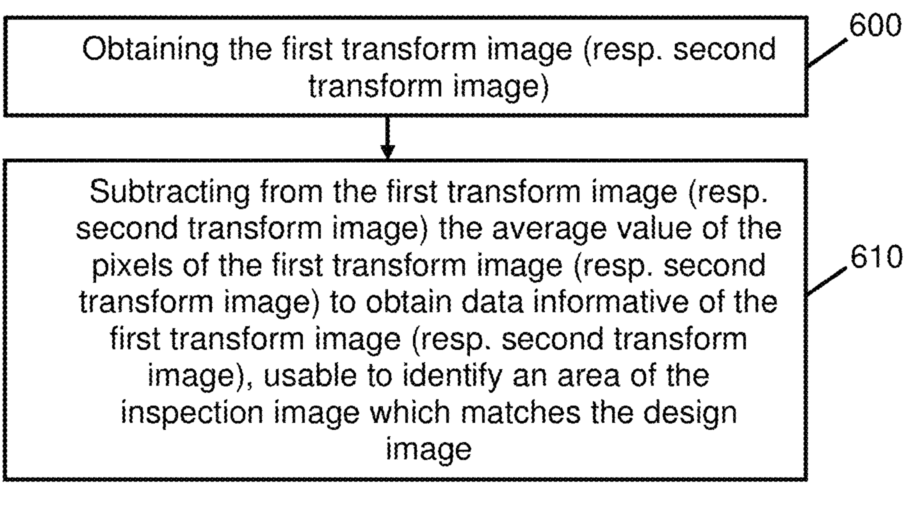
FIG. 6A illustrates a generalized flow-chart of a method of generating data informative of a first transform image, usable in the process of registering a design image with an inspection image.

FIG. 6A describes operations which can be performed to determine data informative of the first transform image (respectively second transform image), according to some examples of the invention.

The method of FIG. 6A can include obtaining (operation 600) the first transform image (respectively second transform image) and subtracting (operation 610) from the first transform image (respectively second transform image), the average value of the pixels of the first transform image (respectively second transform image). In some examples, the output of operation 610 (which can correspond to a 2D matrix or to a 2D image) can be included in the data informative of the first transform image used at operation $\mathbf{430_1}$ in FIG. 4A (respectively in the data informative of the second transform image used at operation $\mathbf{430_2}$ in FIG. 4A).

Figure 6B:
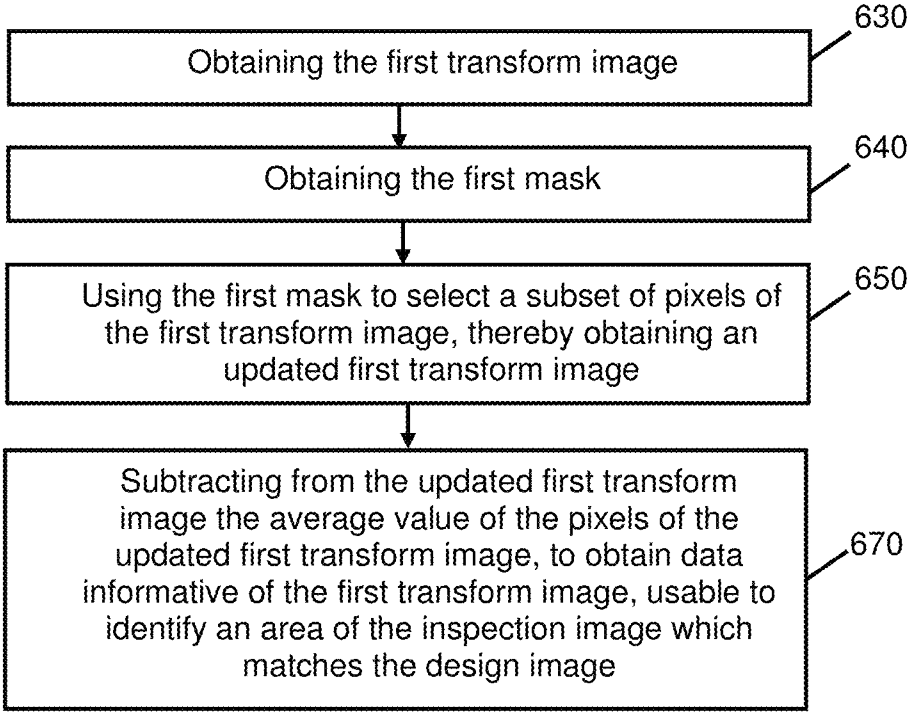
FIG. 6B illustrates a generalized flow-chart of another method of generating data informative of a first transform image, usable in the process of registering a design image with an inspection image.

FIG. 6B illustrates a variant of the method of FIG. 6A.

Assume (see operation 630 in FIG. 6B) that a first transform image has been obtained (see reference 292), as explained with reference to operation $\mathbf{425_1}$.

In some examples, a first mask 562 has been generated (operation 640), in compliance with the method of FIG. 5A. The first mask can be used to select, within the first transform image, only a subset of pixels of the design image which have a position corresponding to non-zero pixels (positive pixels) of the first mask (operation 650), thereby obtaining an updated first transform image. This is illustrated in the non-limitative example of FIG. 6C, in which the updated first transform image 680 is generated based on the first transform image 292 and the first mask 562.

The method of FIG. 6B can further include subtracting from the values of the pixels of the updated first transform image the average value of the pixels of the updated first transform image (operation 670). In some examples, the output of operation 670 (which can correspond to a 2D matrix or to a 2D image) can be included in the data informative of the first transform image used at operation $\mathbf{430_1}$ in FIG. 6A.

Figure 6C:
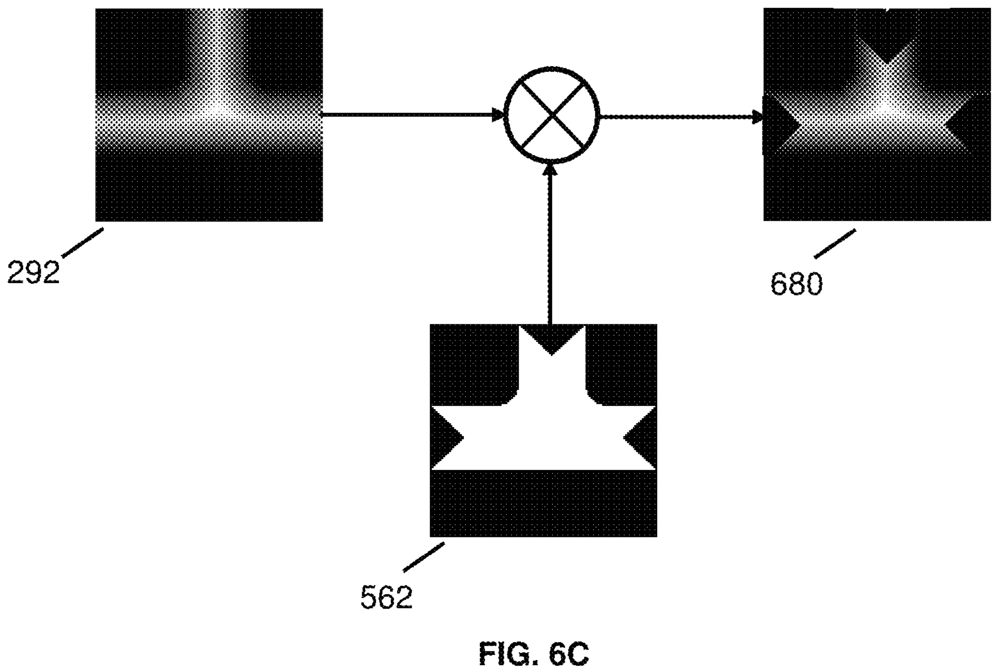
FIG. 6C illustrates a non-limitative example of the method of FIG. 6A or FIG. 6B.
Figure 6D:
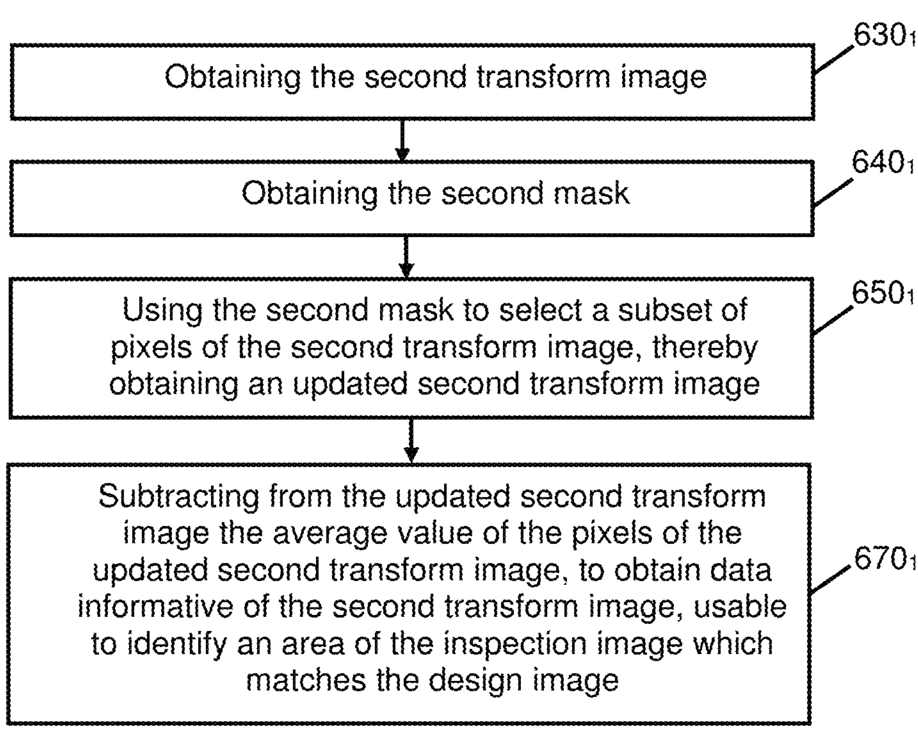
FIG. 6D illustrates a generalized flow-chart of a method of generating data informative of a second transform image, usable in the process of registering a design image with an inspection image.
Figure 6E:
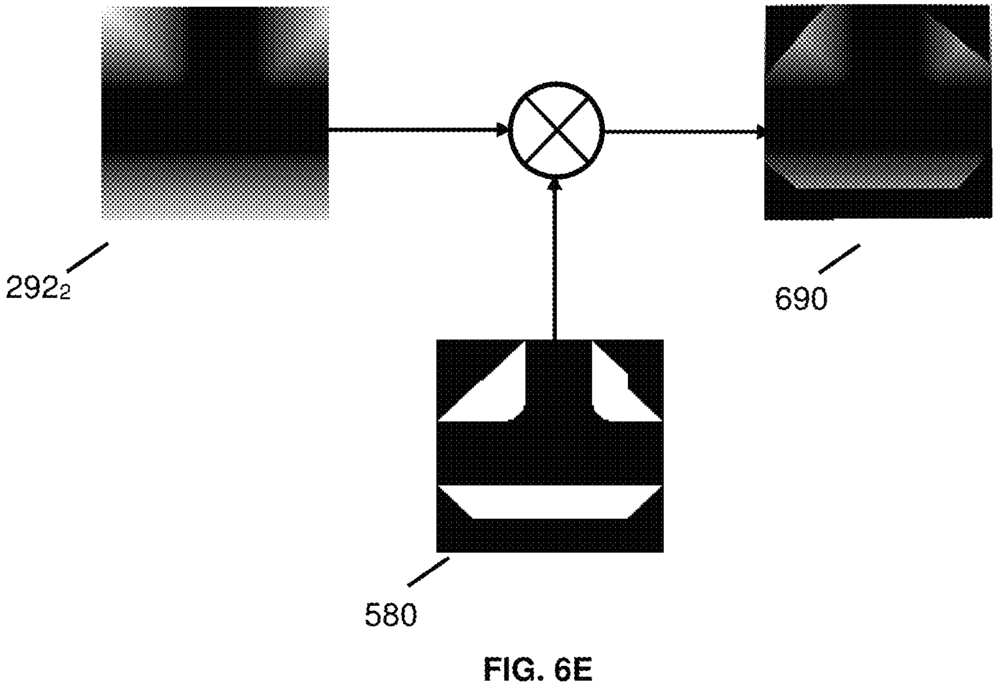
FIG. 6E illustrates a non-limitative example of the method of FIG. 6D.

FIG. 6D illustrates a method similar to the method of FIG. 6C, but applied to the second transform image.

Assume (see operation $\mathbf{630_1}$ in FIG. 6D) that a second transform image has been obtained (see reference $\mathbf{292_2}$), as explained with reference to operation $\mathbf{425_2}$.

In some examples, a second mask 580 has been generated (operation $\mathbf{640_1}$), in compliance with the method of FIG. 5B. The second mask can be used to select, within the second transform image, only a subset of pixels of the design image which have a position corresponding to non-zero pixels (positive pixels) of the second mask (operation $\mathbf{650_1}$), thereby obtaining an updated second transform image. This is illustrated in the non-limitative example of FIG. 6E, in which the updated second transform image 690 is generated based on the second transform image $\mathbf{292_2}$ and the second mask 580.

The method of FIG. 6D can further include subtracting from the values of the pixels of the updated second transform image the average value of the pixels of the updated second transform image (operation $\mathbf{670_1}$). In some examples, the output of operation $\mathbf{670_1}$ (which can correspond to a 2D matrix or to a 2D image) can be included in the data informative of the second transform image used at operation $\mathbf{430_2}$ in FIG. 6A.

Figure 7A:
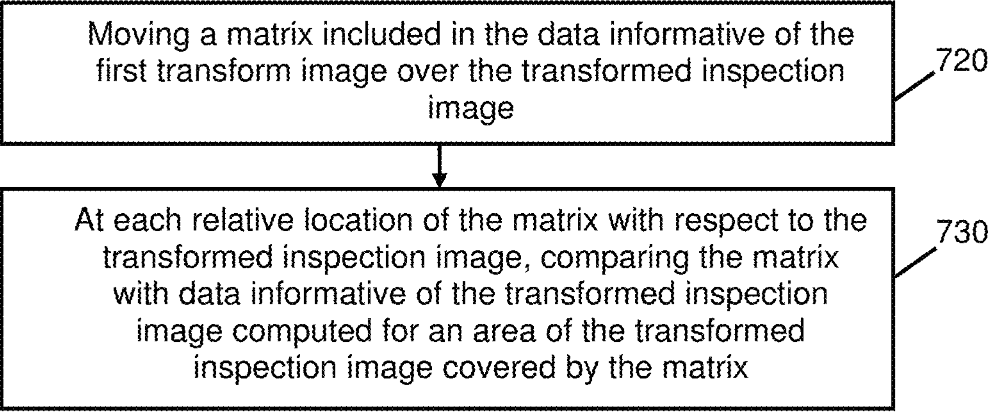
FIG. 7A illustrates a generalized flow-chart of a method of performing a matching operation based on a first transform image, to register a design image with an inspection image.
Figure 7B:
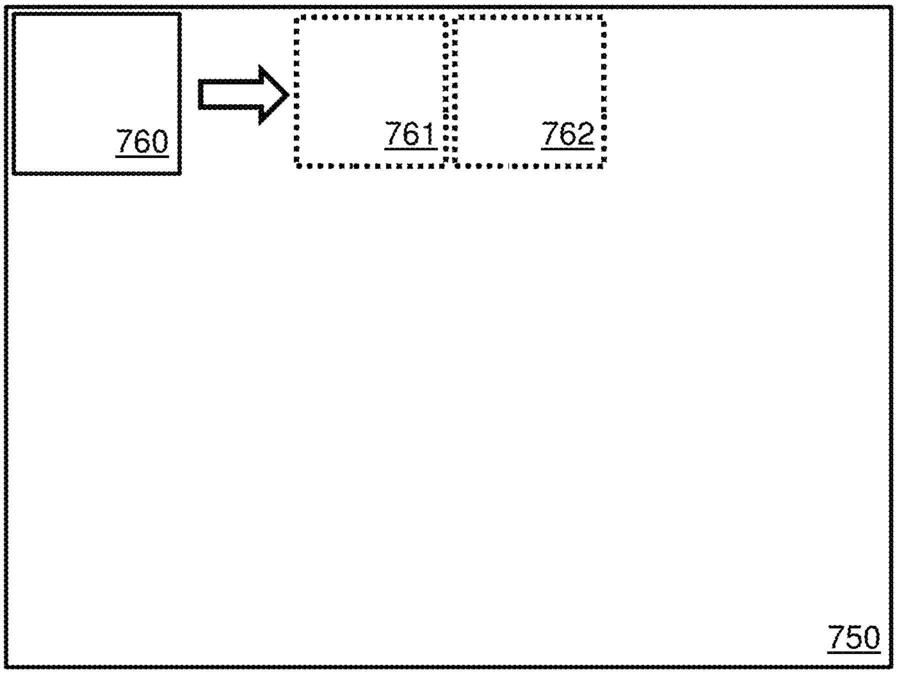
FIG. 7B illustrates a non-limitative example of the method of FIG. 7A.

Attention is now drawn to FIGS. 7A and 7B, which describe a method of performing a matching operation between data informative of the first transform image and data informative of the transformed inspection image (as required in operation $\mathbf{430_1}$ of FIG. 4A), in order to obtain a first matching map.

Assume that data informative of the first transform image includes a 2D matrix 760 (or an image), which can be computed as explained with reference to FIG. 6A or FIG. 6B.

According to some examples, the method of FIG. 7A can include moving (operation 720) the matrix 760 over the transformed inspection image 750. At each relative location of the matrix 760 with respect to the transformed inspection image 750, the matrix covers a given area (see for example 761 or 762) of the transformed inspection image 750. The method of FIG. 7A can include comparing (operation 730) the matrix with data informative of the transformed inspection image computed for this given area. In some examples, data informative of the transformed inspection image computed for this given area can include a second matrix corresponding to the difference between the transformed inspection image and the average value of the pixels of the transformed inspection image.

Operations 720 and 730 can be repeated until the matrix 760 has been moved over the whole transformed inspection image. The output of the method of FIG. 7A can correspond to the first matching data (first matching map) already mentioned with reference to FIG. 4A.

In some examples, the following mathematical equation can be used (this equation is not limitative) to perform the method of FIG. 7A:

$$S(x, y) = \sqrt{\left(\sum_i \sum_k (C_{CAD}(i, k) - C_{SEM}(x + i, y + k))^2\right)} \quad \text{Equation 1}$$

In this equation, $C_{CAD}$ corresponds to the matrix 760 which can be obtained using the method of FIG. 6A or 6B. $C_{SEM}$ corresponds to the difference between the transformed inspection image and the average value of the pixels of the transformed inspection image, for a given area of the transformed inspection image, with coordinates (x, y). Indexes (i,k) correspond to coordinates within the given area (on which the matrix 760 is currently located). S(x,y) corresponds to the matching map. Note that this equation can be used to generate either the first matching map or the second matching map.

The method described with reference to FIGS. 7A and 7B can be performed identically for performing a matching operation between data informative of the second transform image and data informative of the transformed inspection image (as required in operation $\mathbf{430}_2$ of FIG. 4A), in order to obtain a second matching map. This is illustrated in FIGS. 7B and 7C.

Assume that data informative of the second transform image includes a matrix 780 (or an image), which can be computed as explained with reference to FIG. 6A or FIG. 6D.

Figure 7C:
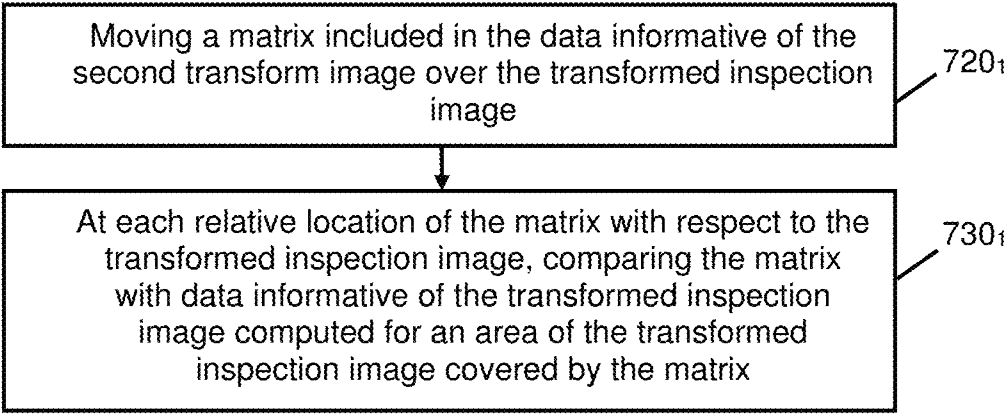
FIG. 7C illustrates a generalized flow-chart of a method of performing a matching operation based on a second transform image, to register a design image with an inspection image.
Figure 7D:
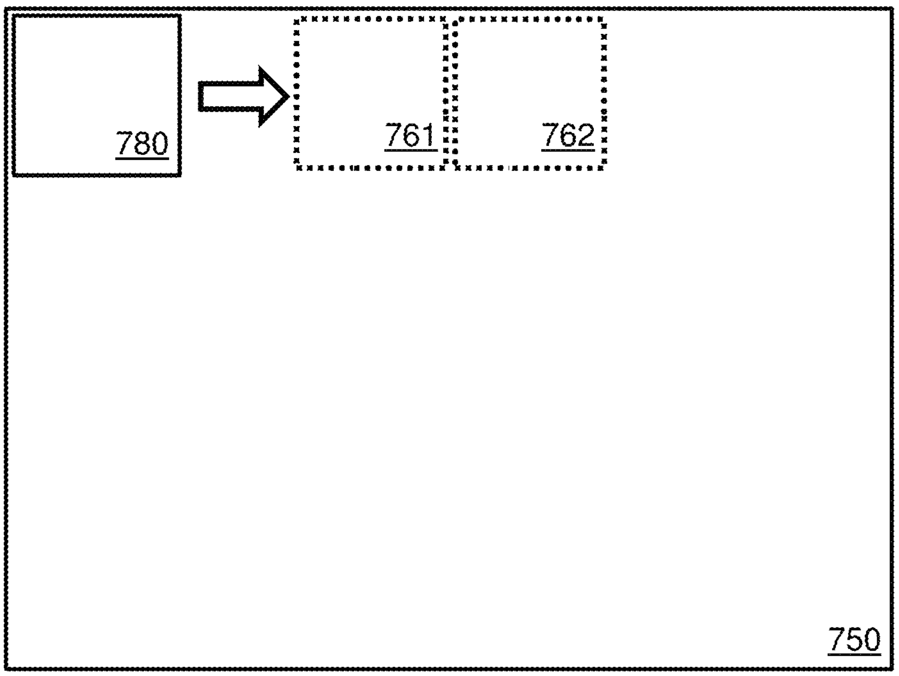
FIG. 7D illustrates a non-limitative example of the method of FIG. 7C.

According to some examples, the method of FIG. 7C can include moving (operation $\mathbf{720}_1$) the matrix 780 over the transformed inspection image 750. At each relative location of the matrix 780 with respect to the transformed inspection image 750, the matrix 780 covers a given area (see for example 761 or 762) of the transformed inspection image 750. The method of FIG. 7C can include comparing (operation $\mathbf{730}_1$) the matrix with data informative of the transformed inspection image computed for this given area. In some examples, data informative of the transformed inspection image computed for this given area can include a second matrix corresponding to the difference between the transformed inspection image and the average value of the pixels of the transformed inspection image.

Operations $\mathbf{720}_1$ and $\mathbf{730}_1$ can be repeated until the matrix 780 has been moved over the whole transformed inspection image. The output of the method of FIG. 7C can correspond to the second matching data (second matching map) already mentioned with reference to FIG. 4A.

Figures 8A, 8B:
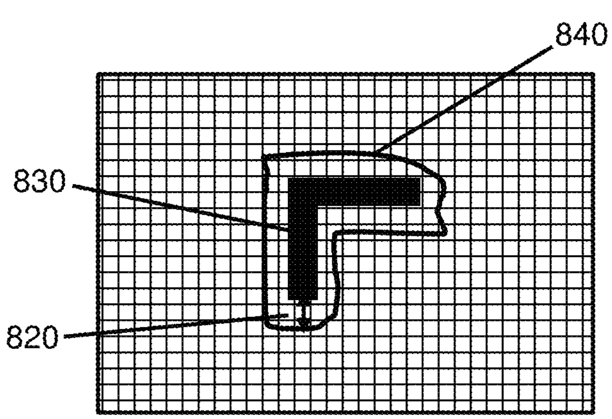
FIG. 8A illustrates a generalized flow-chart of a method of determining size difference between design structural elements of a design image and corresponding structural elements of an inspection image.
FIG. 8B illustrates a non-limitative example of the method of FIG. 8A.

Attention is now drawn to FIG. 8A, which illustrates a method of estimating the dilation between the design structural element(s) and the actual structural element(s).

Assume that a given area of the inspection image has been identified as matching the design image (operation 800), using the various methods described above.

According to some examples, it is possible to estimate (operation 810) a difference in size between structural element(s) of the given area of the inspection image and corresponding design structural element(s) in the design image. This difference can be obtained using at least part of the data informative of the transformed inspection image. In some examples, this difference in size can correspond to the average value of pixels of the transformed inspection image in the given area. This provides an estimate of the difference in size (expressed in pixels) between the structural element (s) of the inspection image with respect to the corresponding design structural element(s). This can correspond to an estimate of a widening of the one or more structural element (s) of the inspection image with respect to the corresponding design structural element(s) of the design image, or to an estimate of the narrowing of the one or more structural element(s) of the inspection image with respect to the corresponding design structural element(s) of the design image.

Note that in practice the difference in size can vary between the different pairs of design structural element/corresponding structural element. In addition, for a given pair, the difference in size may vary depending on the axis (horizontal X axis or vertical Y axis). The method can provide an average or overall estimate of the size difference, for all structural elements of the area of the inspection image matching the design image.

A non-limitative example is provided in FIG. 8B, in which the difference in size 820 (in this example, widening) between a design structural element 830 and a corresponding structural element 840 is estimated as two pixels.

Figure 8C:
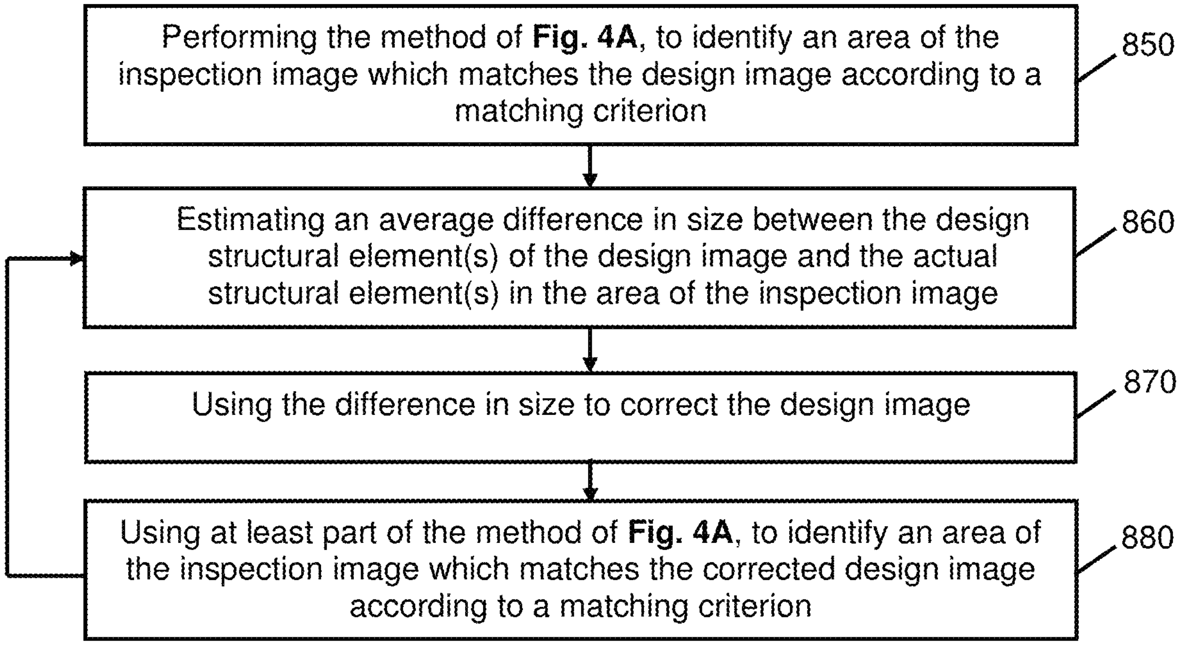
FIG. 8C illustrates a generalized flow-chart of an iterative method of registering a design image with an inspection image.

Attention is now drawn to FIG. 8C, which describes an iterative process which can be performed in order to register the design image with the inspection image, according to some examples of the present invention.

The method of FIG. 8C includes performing (operation 850) the method of FIG. 4A, already described above. This enables identifying an area of the inspection image which matches the design image according to a matching criterion. In addition, as explained with reference to FIG. 8A, it is possible to determine whether structural element(s) belonging to the part of the inspection image matching the design image have been narrowed or widened with respect to the design structural element(s), and to estimate the difference in size (operation 860).

In response to this determination, the method of FIG. 8B includes using the estimated difference in size to correct the design structural element(s) of the design image, to obtain a corrected design image (operation 870). In particular, after this correction, the dimensions of the design structural element(s) in the corrected design image should better match the dimensions of the corresponding structural element(s) of the inspection image.

The method can further include using at least part of the method of FIG. 4A (in particular operations $\mathbf{425}_1$, $\mathbf{430}_1$, $\mathbf{425}_2$, $\mathbf{430}_2$ and 440), to identify an area of the inspection image which matches the corrected design image according to a matching criterion (operation 880).

The process can be repeated sequentially, in which a difference in size between the design structural elements and the actual structural element(s) is estimated, to again correct the design image, which can be then reused to identify an area of the inspection image matching the current version of the design image (corrected as explained above).

The process can be repeated until a convergence criterion is met. For example, the convergence criterion can dictate a number of iterations of the sequence, a maximal processing time, a threshold for the difference in size between the elements for which the process can be stopped, etc.

Figure 9:
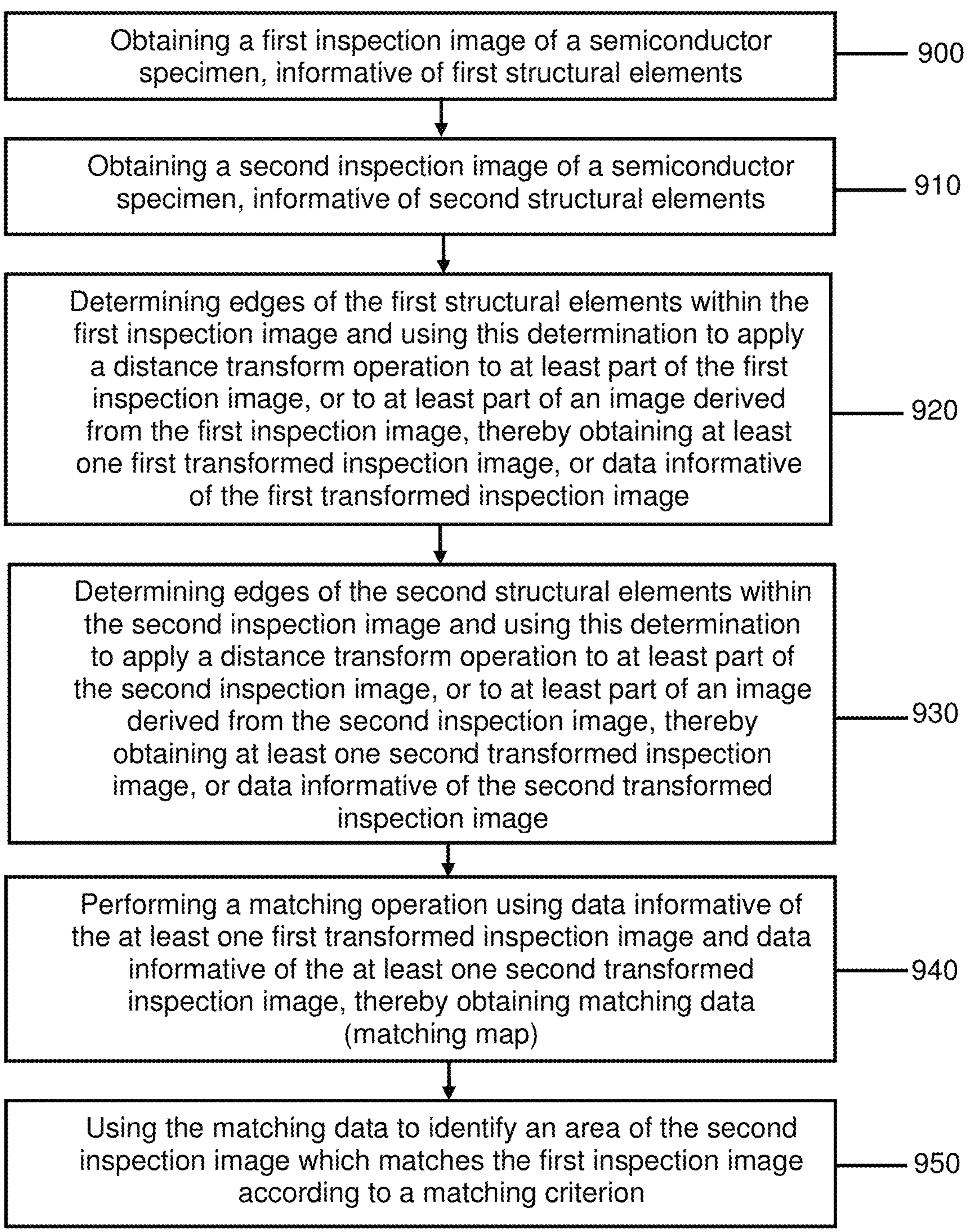
FIG. 9 illustrates a generalized flow-chart of a method of registering two inspection images.

Attention is now drawn to FIG. 9. Various principles which have been described above can be used to perform a registration between a first inspection image (e.g., SEM image) and a second inspection image (e.g., SEM image), and are therefore not described again.

The method of FIG. 9 includes obtaining (operation 900) a first inspection image of a semiconductor specimen. The first inspection image can be acquired by an examination tool (see references 101 and 102 in FIG. 1). In some examples, the examination tool is a SEM. This is not limitative. The first inspection image is informative of a plurality of first structural elements.

The method of FIG. 9 includes obtaining (operation 910) a second inspection image of a semiconductor specimen. The second inspection image can be acquired by an examination tool (see references 101 and 102 in FIG. 1). In some examples, the examination tool is a SEM. This is not limitative. The second inspection image is informative of a plurality of second structural elements.

In some examples, the first inspection image is of smaller size than the second inspection image, and it is desired to find an area of the second inspection image which best matches the first inspection image. The first inspection image can therefore correspond to a pattern SEM image which has to be registered with the second inspection image.

Note that the first inspection image and the second inspection can be informative of the same semiconductor specimens, or of different semiconductor specimens.

The method of FIG. 9 further includes (operation 920) determining edges of the first structural elements within the first inspection image or within an image derived from the first inspection image (using an image processing algorithm, or a segmentation algorithm, or any other adapted means), and applying a distance transform operation to at least some pixels of the first inspection image (or of an image derived thereof). In some examples, a distance transform operation is applied to all or most pixels of the first inspection image which do not belong to the edges (or to all or most pixels of the image derived from the first inspection image, which do not belong to the edges). According to some examples, the distance transform operation enables determining the distance of each pixel of the first inspection image (or of an image derived from the first inspection image) to the closest edge. This enables obtaining a first transformed inspection image, or data informative thereof (which can include values per pixel of the first transformed inspection image). Note that the term "first transformed inspection image" is a formal term used to facilitate the description of the method, but is not limitative: other terms could be used to described the output of operation 920, such as transform image, or first transform image, or any other term.

The method of FIG. 9 further includes (operation 930) determining edges of the second structural elements within the first inspection image or within an image derived from the second inspection image (using an image processing algorithm, or a segmentation algorithm, or any other adapted means), and applying a distance transform operation to at least some pixels of the second inspection image (or of an image derived thereof). In some examples, operation 930 includes applying a distance transform operation to all or most pixels of the second inspection image which do not belong to the edges (or to all or most pixels of the image derived from the second inspection image, which do not belong to the edges). According to some examples, the distance transform operation enables determining the distance of each pixel of the second inspection image (or of an image derived from the first inspection image) to the closest edge. This enables obtaining a second transformed inspection image, or data informative thereof (which can include values per pixel of the second transformed inspection image). Note that the term "second transformed inspection image" is a formal term used to facilitate the description of the method, but is not limitative: other terms could be used to described the output of operation 930, such as transform image, or second transform image, or any other term.

The method of FIG. 9 further includes performing (operation 940) a matching operation using data informative of the first transformed inspection image and data informative of the second transformed inspection image. In particular, it can be attempted to find which area of the first transformed inspection image (first SEM image after distance transform operation) best matches the second transformed image (second SEM image after distance transform operation).

According to some examples, the first transformed inspection image (or an image derived thereof) can be "displaced" over the second transformed inspection image (or an image derived therefore), and, at each location, a comparison can be performed to determine the level of matching. Note that this "displacement" can be achieved using a mathematical operator, such as a convolution. In some examples, an equation similar to Equation 1 can be used. This comparison enables obtaining matching data. According to some examples, the matching data can include a matching map which indicates the level of matching between the first transformed inspection image and the second transformed inspection image at various locations. In some examples, the matching map includes a plurality of values indicative of the level of correlation/level of matching at each location, and it is possible to perform an interpolation between these values in order to increase the resolution.

For each area in the second transformed inspection image, the matching map can indicate the level of matching between the first transformed inspection image and the second transformed inspection image. Note that the level of matching of an area of the second transformed inspection image with the first transformed inspection image reflects the level of matching between the same area in the second inspection image with the first inspection image. This therefore enables registering the first inspection image with the second inspection image.

The method can further include (operation 950) using the matching data to identify an area of the second inspection image which matches the first inspection image according to a matching criterion. The matching criterion can for example define that the area of the second inspection image which best matches the first inspection image (according to the method of FIG. 9) corresponds to the searched area. Note that this match may be not fully perfect. For example, assume that a given area with a given location has been identified in the matching map as corresponding to the best match. The area of the second inspection image corresponding to this given location therefore includes the pixels of the second inspection image for which there is the most accurate overlay with the first inspection image. Registration between the first inspection image and the second inspection image is therefore obtained.

When registering a design image with an inspection image (SEM image), it has been mentioned that two transform images can be generated from the design image (a first transform image generated from the pixels located in the inner portions of the structural elements of the design image, and a second transform image generated from the pixels located in the outer portions of the structural elements of the design image). This can be used when it is unknown which part of the inspection image corresponds to inner portions of structural elements of the design image and which part of the inspection image corresponds to outer portions of structural elements of the design image. When registering two inspection images (as in FIG. 9), it is not necessary to generate two transform images for one of the inspection images, since the two inspection images have the same pattern distribution of features and space between features.

In the detailed description, numerous specific details have been set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the aforementioned discussions, it is appreciated that throughout the specification discussions utilizing terms such as "obtaining", "applying", "determining", "performing", "using", "increasing", "reducing", "estimating", or the like, refer to the action(s) and/or process(es) of a computer that manipulate and/or transform data into other data, said data represented as physical, such as electronic, quantities and/or said data representing the physical objects.

The terms "computer" or "computer-based system" should be expansively construed to include any kind of hardware-based electronic device with a data processing circuitry (e.g., digital signal processor (DSP), a GPU, a TPU, a field programmable gate array (FPGA), an application specific integrated circuit (ASIC), microcontroller, microprocessor etc.), including, by way of non-limiting example, the computer-based system 103 of FIG. 1 and respective parts thereof disclosed in the present application. The data processing circuitry (designated also as processing circuitry-see e.g., reference 104) can comprise, for example, one or more processors operatively connected to computer memory, loaded with executable instructions for executing operations, as further described below. The data processing circuitry encompasses a single processor or multiple processors, which may be located in the same geographical zone, or may, at least partially, be located in different zones, and may be able to communicate together. The one or more processors can represent one or more general-purpose processing devices such as a microprocessor, a central processing unit, or the like. More particularly, a given processor may be one of: a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., main memory such as, e.g., read-only memory (ROM), flash memory, dynamic random access memory (DRAM) such as synchronous DRAM (SDRAM) or Rambus DRAM (RDRAM), etc.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

It is to be noted that while the present disclosure refers to the processing circuitry 104 being configured to perform various functionalities and/or operations, the functionalities/operations can be performed by the one or more processors of the processing circuitry 104 in various ways. By way of example, the operations described hereinafter can be performed by a specific processor, or by a combination of processors. The operations described hereinafter can thus be performed by respective processors (or processor combinations) in the processing circuitry 104, while, optionally, at least some of these operations may be performed by the same processor. The present disclosure should not be limited to be construed as one single processor always performing all the operations.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination", or its derivatives used in this specification, is not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase, at least some of the suspected locations are more thoroughly analyzed with relatively high resolution. In some cases, both phases can be implemented by the same inspection tool, and, in some other cases, these two phases are implemented by different inspection tools.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats such as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter, fewer, more, and/or different stages than those shown in the methods of FIGS. 2A, 3A, 4A, 4B, 5A, 5C, 6A, 6B, 6D, 7A, 7C, 8A, 8C and 9 may be executed. In embodiments of the presently disclosed subject matter, one or more stages illustrated in the methods of FIGS. 2A, 3A, 4A, 4B, 5A, 5C, 6A, 6B, 6D, 7A, 7C, 8A, 8C and 9 may be executed in a different order, and/or one or more groups of stages may be executed simultaneously.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system comprising one or more processing circuitries configured to:

obtain:

an inspection image of a semiconductor specimen, wherein the inspection image is informative of a plurality of first structural elements, and a second inspection image of a semiconductor specimen, wherein the inspection image and the second inspection image are informative of the same semiconductor specimen, or of different semiconductor specimens, wherein the second inspection image is informative of a plurality of second structural elements, determine edges of at least part of the first structural elements, and use at least part of said edges to apply a distance transform operation to at least part of the inspection image, or to at least part of an image derived from the inspection image, to obtain a transformed inspection image, or data informative thereof, determine edges of at least part of the second structural elements, and use at least part of said edges to apply a distance transform operation to at least part of the second inspection image, or to at least part of an image derived from the second inspection image, thereby obtaining at least one transform image, or data informative thereof, perform a matching operation using data informative of the at least one transform image and data informative of the transformed inspection image, thereby obtaining matching data, and use the matching data to identify an area of the inspection image which matches the second inspection image according to a matching criterion.

2. The system of claim 1, wherein, for at least one given first structural element of the plurality of first structural elements present in the inspection image, the system is configured to use the matching data to determine whether one or more dimensions of the given first structural element have been increased or reduced with respect to one or more dimensions of a corresponding second structural element in the second inspection image.

3. The system of claim 2, configured to perform at least one of (i) or (ii):

(i) responsive to determination that one or more dimensions of the given first structural element have been increased with respect to one or more dimensions of the corresponding second structural element in the second inspection image, the system is configured to increase one or more dimensions of the corresponding second structural element in the second inspection image, thereby obtaining a corrected second image, and to use the corrected second image to identify an area of the inspection image which matches the corrected second image according to the matching criterion; or (ii) responsive to determination that one or more dimensions of the given first structural element have been reduced with respect to one or more dimensions of the corresponding second structural element in the second inspection image, the system is configured to reduce one or more dimensions of the corresponding second structural element in the second inspection image, thereby obtaining a corrected second image, and to use the corrected second image to identify an area of the inspection image which matches the corrected second image according to the matching criterion.

4. The system of claim 1, wherein, for at least one given first structural element present in the inspection image, the system is configured to use data informative of the transformed inspection image to estimate a difference in size between the given first structural element and a corresponding second structural element in the second inspection image.

5. A method comprising performing, by one or more processing circuitries:

obtaining an inspection image of a semiconductor specimen, and a design image informative of one or more design structural elements, applying a distance transform operation to at least part of the inspection image, or to at least part of an image derived from the inspection image, thereby obtaining a transformed inspection image, or data informative thereof, applying a distance transform operation to a first group of pixels of the design image, or to an image derived from the design image, thereby obtaining at least one first transform image, applying a distance transform operation to a second group of pixels of an image derived from a complement of the design image, thereby obtaining at least one second transform image, performing a matching operation using data informative of the at least one first transform image and data informative of the transformed inspection image, thereby obtaining first matching data, performing a matching operation using data informative of the at least one second transform image and data informative of the transformed inspection image, thereby obtaining second matching data, and using the first and second matching data to identify an area of the inspection image which matches the design image according to a matching criterion.

6. A system comprising one or more processing circuitries configured to:

obtain:

an inspection image of a semiconductor specimen, wherein the inspection image is informative of a plurality of first structural elements, and a design image, apply a distance transform operation to at least part of the design image, or to at least part of an image derived from the design image, thereby obtaining at least one transform image, or data informative thereof, determine edges of at least part of the first structural elements, use at least part of said edges to apply a distance transform operation to at least part of the inspection image, or to at least part of an image derived from the inspection image, thereby obtaining a transformed inspection image, or data informative thereof, perform a matching operation using data informative of the at least one transform image and data informative of the transformed inspection image, thereby obtaining matching data, and use the matching data to identify an area of the inspection image which matches the design image according to a matching criterion.

7. The system of claim 6, configured to apply a distance transform operation to a subset of pixels of the design image, or of an image derived from the design image, which have a pixel intensity equal to a first value, or within a first range, thereby obtaining the at least one transform image.

8. The system of claim 6, configured to apply a distance transform operation to pixels of an image obtained using a complement of the design image or of an image derived from the design image, thereby obtaining the at least one transform image.

9. The system of claim 6, configured to:

apply a distance transform operation to a first group of pixels of the design image, or to an image derived from the design image, thereby obtaining at least one first transform image, apply a distance transform operation to a second group of pixels of an image derived from a complement of the design image, thereby obtaining at least one second transform image, perform a matching operation using data informative of the at least one first transform image and data informative of the transformed inspection image, thereby obtaining first matching data, perform a matching operation using data informative of the at least one second transform image and data informative of the transformed inspection image, thereby obtaining second matching data, and use the first and second matching data to identify an area of the inspection image which matches the design image according to a matching criterion.

10. The system of claim 6, wherein the design image is informative of one or more design structural elements, wherein the system is configured to:

apply a distance transform operation to pixels of the design image, or of an image derived from the design image, which are located within an inner portion of each design structural element, thereby obtaining the at least one transform image, apply a distance transform operation to pixels of the design image, or of an image derived from the design image, which are located outside of the design structural elements, thereby obtaining a second transform image, and use the at least one transform image and the second transform image to identify an area of the inspection image which matches the design image according to a matching criterion.

11. The system of claim 6, wherein at least one of (i) or (ii) is met:

(i) data informative of the at least one transform image includes data informative of a difference between the at least one transform image and an average value of pixels of the at least one transform image; or (ii) data informative of the transformed inspection image includes data informative of a difference between part of the transformed inspection image and an average value of pixels of said part of the transformed inspection image.

12. The system of claim 6, configured to:

apply a distance transform operation to pixels which have a pixel intensity equal to a first value, or within a first range, in the design image, or in an image derived from the design image, to obtain the at least one transform image, add artificial edges at boundaries of the design image, or to the image derived from the design image, to obtain a first design image, apply a distance transform operation to pixels which have a pixel intensity equal to the first value, or within the first range, in the first design image, to obtain a third transform image, perform a comparison between pixels of the at least one transform image and pixels of the third transform image, generate a first mask based on the comparison, and use the first mask to generate data informative of the at least one transform image.

13. The system of claim 10, configured to:

apply a distance transform operation to given pixels of a second design image obtained based on a complement of the design image, wherein the second design image includes artificial edges, to obtain a fourth transform image, perform a comparison between pixels of the second transform image and pixels of the fourth transform image, generate a second mask based on this comparison, and use the second mask to generate data informative of the at least one transform image.

14. The system of claim 6, wherein the design image is informative of design elements and of areas separating the design elements, wherein the system is operative to determine a match between the design image and an area of the inspection image in a configuration in which it is unknown which pixels belong to an inner part of the design elements of the design image and which pixels belong to the areas of the design image.

* * * * *